United States Patent
Powell

(10) Patent No.: US 7,758,742 B2
(45) Date of Patent: Jul. 20, 2010

(54) METHOD AND APPARATUS FOR SEPARATION OF WATER FROM PETROLEUM PRODUCTS IN AN ELECTROCOAGULATION PROCESS

(76) Inventor: Scott Wade Powell, 19331 E. Tufts Cir., Centennial, CO (US) 80015-5820

( * ) Notice: Subject to any disclaimer, the term of this patent is extended or adjusted under 35 U.S.C. 154(b) by 1278 days.

(21) Appl. No.: 11/197,893

(22) Filed: Aug. 4, 2005

(65) Prior Publication Data
US 2005/0274606 A1  Dec. 15, 2005

Related U.S. Application Data

(60) Continuation-in-part of application No. 10/050,725, filed on Jan. 15, 2002, now Pat. No. 7,211,185, which is a continuation-in-part of application No. 09/644,513, filed on Aug. 24, 2000, now Pat. No. 6,488,835, which is a division of application No. 09/259,246, filed on Feb. 26, 1999, now Pat. No. 6,139,710.

(60) Provisional application No. 60/076,298, filed on Feb. 27, 1998.

(51) Int. Cl.
C02F 1/00 (2006.01)
C02F 1/463 (2006.01)
(52) U.S. Cl. .................... 205/742; 205/695
(58) Field of Classification Search ............... 204/673
See application file for complete search history.

(56) References Cited

U.S. PATENT DOCUMENTS

| | | | |
|---|---|---|---|
| 2,182,145 A * | 12/1939 | Eddy | ............ 204/570 |
| 3,340,175 A | 9/1967 | Mehl | |
| 3,788,967 A | 1/1974 | Kawahata et al. | |
| 3,793,173 A | 2/1974 | Kawahata et al. | |
| 3,925,176 A | 12/1975 | Okert | |
| 3,966,567 A | 6/1976 | Pace et al. | |
| 4,036,726 A | 7/1977 | Gale et al. | |
| 4,119,520 A | 10/1978 | Paschakarins et al. | |

(Continued)

FOREIGN PATENT DOCUMENTS

AU 80591/82 9/1982

(Continued)

OTHER PUBLICATIONS

U.S. Appl. No. 11/677,896, filed Feb. 22, 2007, Powell.

(Continued)

*Primary Examiner*—Harry Wilkins
*Assistant Examiner*—Zulmariam Mendez
(74) *Attorney, Agent, or Firm*—Sheridan Ross PC

(57) ABSTRACT

An electrocoagulation treatment device includes a plurality of spaced reaction plates disposed within a reaction chamber. A voltage is applied to selected reaction plates to create an electrical field within the electrocoagulation chamber. The plates are arranged vertically which induces a vertical flow of liquid through a device. The device includes various embodiments adapted for use as a large industrial unit, a portable unit or for use within the home. The voltage and amperage of the electrical field chamber may be adjusted by placing selected reaction plates in electrical contact with the voltage source. One embodiment is especially adapted for treatment of oil slop to remove water from the oil, and for treatment of seawater to desalinate the same.

7 Claims, 9 Drawing Sheets

U.S. PATENT DOCUMENTS

| | | | |
|---|---|---|---|
| 4,176,038 | A | 11/1979 | Moeglich |
| 4,293,400 | A | 10/1981 | Liggett |
| 4,321,125 | A | 3/1982 | Nazarian et al. |
| 4,329,211 | A | 5/1982 | Plantes et al. |
| 4,450,060 | A | 5/1984 | Gonzalez |
| 4,623,436 | A | 11/1986 | Umehara |
| 4,708,809 | A | 11/1987 | Davis |
| 4,770,755 | A | 9/1988 | Valanti et al. |
| 4,790,923 | A | 12/1988 | Stillman |
| 4,872,959 | A | 10/1989 | Herbst et al. |
| 4,919,775 | A | 4/1990 | Ishigaki |
| 5,043,050 | A | 8/1991 | Herbst |
| 5,227,071 | A | 7/1993 | Torline et al. |
| 5,302,273 | A | 4/1994 | Kemmerer |
| 5,423,962 | A | 6/1995 | Herbst |
| 5,525,126 | A | 6/1996 | Basu et al. |
| 5,549,812 | A | 8/1996 | Witt a.k.a. Witte |
| 5,571,399 | A | 11/1996 | Allen |
| 5,611,907 | A | 3/1997 | Herbst et al. |
| 5,741,426 | A | 4/1998 | McCabe et al. |
| 5,804,062 | A | 9/1998 | Wyness |
| 5,866,019 | A | 2/1999 | Wyness |
| 5,928,490 | A | 7/1999 | Sweeney |
| 5,928,493 | A | 7/1999 | Morkovsky et al. |
| 5,985,139 | A | 11/1999 | Zoeller |
| 6,139,710 | A | 10/2000 | Powell |
| 6,171,498 | B1 | 1/2001 | Fassbender et al. |
| 6,325,916 | B1 | 12/2001 | Lambert et al. |
| 6,346,197 | B1 | 2/2002 | Stephenson et al. |
| 6,358,398 | B1 | 3/2002 | Halldorson et al. |
| 6,488,835 | B1 | 12/2002 | Powell |
| 6,689,271 | B2 | 2/2004 | Morkovsky et al. |
| 6,719,894 | B2 | 4/2004 | Gavrel et al. |
| 6,755,970 | B1 | 6/2004 | Knappe et al. |
| 6,855,838 | B2 | 2/2005 | Haas et al. |
| 6,890,451 | B2 | 5/2005 | Sapienza et al. |
| 6,965,044 | B1 | 11/2005 | Hammond et al. |
| 7,008,538 | B2 | 3/2006 | Kasparian et al. |
| 7,264,732 | B2 | 9/2007 | Bradley |
| 7,404,900 | B2 | 7/2008 | Bradley |
| 7,410,584 | B2 | 8/2008 | Devine |
| 2003/0121864 | A1 | 7/2003 | Kin et al. |
| 2005/0045534 | A1 | 3/2005 | Kin et al. |
| 2005/0081435 | A1 | 4/2005 | Lastella |
| 2005/0120621 | A1 | 6/2005 | Lawson et al. |
| 2005/0262760 | A1 | 12/2005 | Lawson et al. |
| 2006/0080891 | A1 | 4/2006 | Ghosh et al. |
| 2006/0111600 | A1 | 5/2006 | Mecham |

FOREIGN PATENT DOCUMENTS

| | | |
|---|---|---|
| AU | 569026 | 8/1983 |
| AU | 685260 | 10/1995 |
| AU | 707432 | 10/1996 |
| AU | 721834 | 5/1998 |
| DE | 2832664 C2 | 7/1986 |
| DE | 1526687 | 9/1998 |
| GB | 1526687 | 9/1978 |
| JP | 61 164695 | 7/1986 |
| JP | 61164695 | 12/1986 |
| WO | WO 94 00860 | 1/1994 |
| WO | WO 96/17667 | 6/1996 |
| WO | WO 96/40591 | 12/1996 |
| WO | WO 98/17589 | 4/1998 |
| WO | WO 01/53568 | 1/2001 |

OTHER PUBLICATIONS

U.S. Appl. No. 12/255,903, filed Oct. 22, 2008, Powell.
U.S. Appl. No. 12/276,078, filed Nov. 21, 2008, Powell.
"Clarifiers", Clarifier, Waste Treatment Clarifier, clarifiers, Met-Chem, Inc. web page, as early as Mar. 18, 2007, available at http://www.metchem.com/clarifier.htm, printed on Oct. 21, 2008, pp. 1-2.
"Memcor® Membranes. Quality. Reliability. Experience.", Memcor Products—Ultrafiltration and Microfiltration Water and Wastewater Systems, Siemens web page, available at http://water.siemens.com/en/product_lines/memcor_products/Pages/default.aspx?g..., printed on Oct. 20, 2008, p. 1.
"Reverse Osmosis", Reverse Osmosis—Wikipedia, the free encyclopedia web page, as early as Apr. 4, 2004, available at http://en.wikipedia.org/wiki/Reverse_osmosis, printed on Oct. 22, 2008, pp. 1-6.
"Sewage treatment", Sewage treatment—Wikipedia, the free encyclopedia web page, as early as Jan. 24, 2004, available at http://en.wikipedia.org/wiki/Sewage_treatment, printed on Oct. 22, 2008, pp. 1-10.
"Ultrafiltration", Ultrafiltration—Wikipedia, the free encyclopedia web page, available at http://en.wikipedia.org/wiki/Utrafiltration, printed on Oct. 22, 2008, p. 1.
"Ultrafiltration", ultrafiltration: Definition from Answers.com website, as early as May 26, 2005, available at http://www.answers.com/topic/ultrafiltration, printed on Oct. 20, 2008, p. 1.
"Water purification", Water purification—Wikipedia, the free encyclopedia web page, as early as May 9, 2004, available at http://en.wikipedia.org/wiki/Water_purification, printed on Oct. 22, 2008, pp. 1-5.
Amended Statement of Grounds and particulars related to Australian Patent 738707 (related to U.S. Appl. No. 10/050,725), 5 pages.
Barkley et al.; "Emerging Technology Summary-Electro-Pure Alternating Current Electrocoagulation"; Superfund Innovative Technology Evaluation, EPA/640/S-937507; Sep. 1993.
Brian Grigg; AWWA Trade Waste Interest Group and Institute for Sustainable Futures—Joint Seminar, Sep. 14-15, 1999; 6 pages.
Cardia Technologies Ltd.; Electrocoagulation Advertisement; 7 pages.
Electro-Coagulation—Water Treatment Technology; 6 pages.
Electrocoagulation Systems; 9 pages.
English Translation of Japanese Laid Open Patent Gazette 7-116667.
Horn; "Informational Memorandum for the Deputy Secretary of Agriculture of the U.S. re: Electrocoagulation"; Dec. 11, 1995.
Scott Wade Powell; Vortex™ Water Systems, LLC—Electrocoagulation—A Technical Analysis; 25 pages.
Smith; "Applications of New Concepts of Physical-Chemical Wastewater Treatment"; Progress in Water Technology, vol. 1, Pergamon Press, edited by W.W. Eckenfelder et al., paper presented at Vanderbilt University, sponsored by the International Association on Water Pollution Research & the American Institute of Chemical Engineers, Sep. 18-22, 1972.
Vortex™ Water Systems, LLC—Advertisement; 6 pages.
Vortex™ Water Systems, LLC—Operating Instructions Manual; 15 pages.
Woytowich et al.; "Electrocoagulation (CURE) Treatment of Ship Bilgewater for the U.S. Coast Guard in Alaska"; MTS Journal, vol. 2, No. 1; pp. 63-67; no month available.
Petition related to a request for Invalidation against Korean Patent Application No. 395731 (related to U.S. Appl. No. 10/050,725), 18 pages.
Statement of Grounds and particulars related to Australian Patent 738707 (related to U.S. Appl. No. 10/050,725, 4 pages.
Holt et al., "Electrocoagulation: A Technology-Oriented Review", 61 pages.
Applicants Admitted Prior Art—1 page.
Amended Statement of Grounds and particulars related to Australian Patent 738707 (related to U.S. Appl. No. 10/050,725), 11 pages.
Fletcher et al., "Industrial Electrochemistry", Second Edition, Chapman-Hall, 1990, Great Britain, pp. 337, 338 & 560, 561.

* cited by examiner

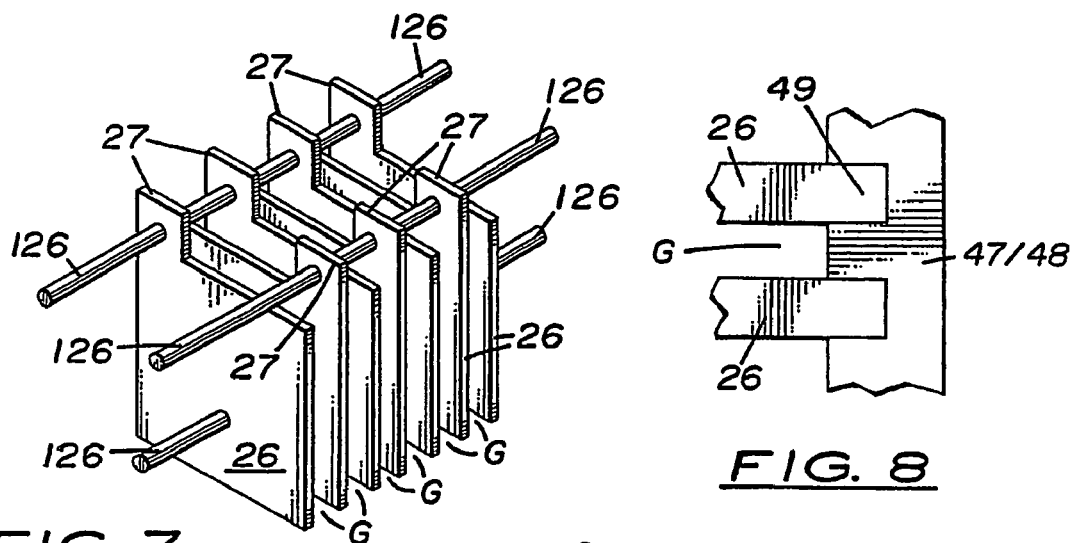
FIG. 7
FIG. 8
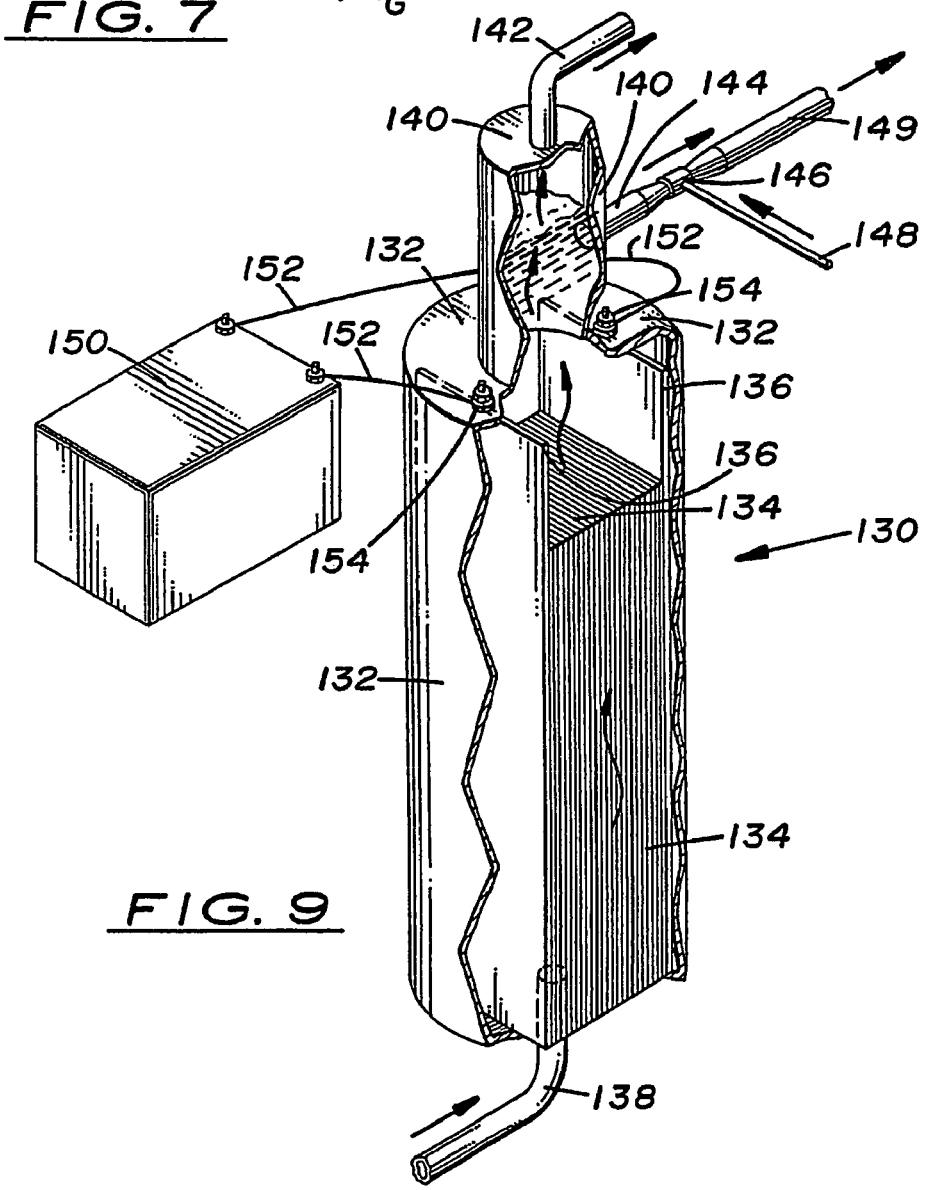
FIG. 9

METHOD AND APPARATUS FOR SEPARATION OF WATER FROM PETROLEUM PRODUCTS IN AN ELECTROCOAGULATION PROCESS

CROSS REFERENCE TO RELATED APPLICATIONS

This application is a continuation-in-part application of U.S. Ser. No. 10/050,725 filed on Jan. 15, 2002, now U.S. Pat. No. 7,211,185 entitled "Method for Electrocoagulation of Liquids", which is a continuation-in-part application of U.S. Ser. No. 09/644,513 filed on Aug. 24, 2000 entitled "Method for Electrocoagulation of Liquids", now U.S. Pat. No. 6,488,835 which is a divisional application of U.S. Ser. No. 09/259,246 filed on Feb. 26, 1999 entitled "Apparatus for Electrocoagulation of Liquids", now U.S. Pat. No. 6,139,710, which is a continuation-in-part application of and claims the benefit of the earlier filed provisional application Ser. No. 60/076,298 filed on Feb. 27, 1998 entitled "Electrocoagulation Device."

TECHNICAL FIELD

The present invention relates to a method and apparatus for treating a liquid and, more particularly, to a method and apparatus for electrocoagulation of liquids by electrolytic treatment to cause impurities in the liquid to be removed or separable.

BACKGROUND ART

It is known in the art to electrolytically treat liquids to allow separation of a broad range of contaminants including metals, solids, pathogens, colloids and other undesirable substances. Electrolytic treatment involves the use of an electrical field which is applied to a liquid contained in a chamber in order to coagulate and otherwise to allow for removal of impurities found in the liquid. One example of a prior art device and method for electrolytic treatment is disclosed in PCT Publication No. WO 9640591. According to this invention, a waste stream is first passed through a polarizing means having an electrical potential that is different than ground potential, and then passed through an electrocoagulation chamber including a plurality of elongate electrodes or electrocoagulation blades which have different electrical potentials in comparison to one another. A plurality of holes are provided in the electrodes to cause turbulence in the waste stream which, in turn, increases the efficiency of the electrocoagulation. Although this device may be adequate for its intended purpose, one disadvantage of this device is that the torturous flow path of the waste stream as it passes through the device requires the electrodes or electrocoagulation blades to be of a high strength to withstand the high water pressure which must be used in order to keep the waste stream from clogging. Because the blades of these devices have to be significant in size and strength, a limited number of them can be used in a specified volume which reduces the actual surface area available for electrocoagulation treatment. Additionally, these coagulation blades require higher input line voltages in order to obtain the desired amperage between the blades in the electrical field because their surface area is limited by the high pressure. Smaller plates can withstand higher pressures, but the ability to maintain a desired amperage is sacrificed because available blade surface area within an electrocoagulation device is directly related to the amperage which can be maintained. Additionally, the torturous path also causes problems due to trapped gases produced by the electrolytic reaction in the chamber which further increases the pressure upon the blades. Accordingly, a high powered pump must be used to overcome the natural tendency of the waste stream to clog within the chamber. This PCT publication encompasses the same subject matter as disclosed in U.S. Pat. No. 5,611,907 to Herbst, et al. and U.S. Pat. No. 5,423,962 to Herbst, and further includes subject matter not found in these other patents.

Other examples of electrolytic treatment devices are disclosed in U.S. Pat. No. 4,293,400 to Liggett and U.S. Pat. No. 4,872,959 to Herbst, et al. These devices utilize electrodes in the form of metal tubes or pipes but require great effort in repairing or replacing the tubes. This amount of down time is unacceptable for many commercial applications.

U.S. Pat. No. 5,043,050 to Herbst discloses flat electrodes used within a coagulation chamber; however, in order for the apparatus of this invention to be used, the edges of the coagulation chamber must be tightly sealed. After long periods of use, the seals are difficult to maintain.

U.S. Pat. No. 3,925,176 to Okert discloses the use of a plurality of electrode plates for electrolytic treatment of liquids. However, these plates are not intended to be removed either as a whole or individually. Furthermore, the device disclosed in this reference cannot be powered in a series electrical connection which is desirable in many circumstances.

U.S. Pat. No. 5,302,273 to Kemmerer discloses an ionic reaction device including a tubular housing with multiple circular electrode plates for the treatment of a fluid. Because of the torturous path utilized in the reaction chamber of this device, high pressures are required to move the liquid through the device, and the device appears susceptible to clogging and excessive gas buildup.

One shortcoming of all of the foregoing prior art references is that there is no means by which to transform the input line voltage to the voltage and amperage necessary to optimize the electrocoagulation treatment without having to use a separate transformer. In other words, the electrocoagulation chambers themselves do not have the capability to transform the input line voltage to a desired voltage and amperage within the electrical field of the electrocoagulation device.

Another shortcoming of the prior art which utilizes a torturous flow path is that the electrodes or electrocoagulation blades require precision holes to be cut to allow gaskets to be bolted between the blades in order to withstand the pressure created by the torturous path. Additionally, the blades have to be laser cut with extreme precision in order to maintain the exact desired path. Deviation from a predetermined path can result in clogging due to buildup of coagulated solids bridging between misaligned blades. These manufacturing requirements greatly add to the cost of building an electrocoagulation device.

Another shortcoming of the prior art, which includes many of those discussed above, is that the blades are not easily removable for replacement or cleaning. Particularly for those chambers utilizing a tortuous path, a great number of bolts and gaskets are required to keep them in alignment. Accordingly, these pieces of hardware must be removed in order to replace the blades.

Each of the foregoing disadvantages are overcome by the apparatus and method of this invention. Additionally, the apparatus and method of this invention achieve other advantages discussed more fully below.

DISCLOSURE OF THE INVENTION

In accordance with one aspect of the present invention, an apparatus for electrocoagulation of liquids is provided. In its simplest form, the device or apparatus includes a housing defining a reaction chamber, and a plurality of spaced reaction plates/blades which are oriented in a vertical position within the reaction chamber. An inlet is provided to allow a desired flow of liquid into the reaction chamber and into the gaps or spaces between the blades. An outlet is provided at an elevation higher than and downstream of the inlet for allowing the liquid to flow from the chamber after the liquid has been treated in the chamber. Selected blades connect to electrical leads which carry an input line voltage. An electrical field is created in the chamber between the electrically connected blades. The electrical leads may be attached to selected blades in order to provide the reaction chamber with the desired voltage and amperage to optimize the electrocoagulation of the particular liquid. The ability to vary voltage and amperage within the electrical field of the chamber can be achieved without the use of a separate transformer. The liquid stream flow is in an upward direction through the reaction chamber in the gaps between the plates/blades. Accordingly, the outlet is positioned at the higher level above the inlet. A pump may be placed upstream of the inlet in order to provide additional head for the flow of liquid passing through the apparatus. A series of prefilters or other preconditioning means may be placed in line with the pump and also upstream of the inlet in order to remove solids or other materials which may otherwise clog the reaction chamber. A control unit rectifies the incoming AC line voltage to a DC voltage. Electrical leads interconnect the blades to the DC voltage made available by the control unit. In addition to rectifying the incoming line voltage, the control unit may incorporate a number of other functions which helps to control the apparatus, such as a means to control the speed of the pump and a voltmeter and ammeter to monitor the conditions within the chamber. However, the control unit does not need a transformer as the electrical connections made with the blades allow the desired voltage and amperage therein to be adjusted, as further discussed below. Additionally, the control unit can be in the form of a programmable logic controller which could not only monitor status condition inputs, but also produce outputs to control the electrocoagulation process. For example, the voltage polarity of the electrical leads extending from the control unit can be reversed based upon a timing sequence controlled by the controller. As a further example, the control unit can measure the flow rate of the liquid stream and adjust it accordingly by either manipulating the pump speed, or adjusting the flow rate through a valve positioned upstream of the inlet. After the liquid stream has been electrolytically treated, the liquid stream may be passed through a development chamber and/or through secondary separation treatment in order to remove the bulk of the contaminants which still remain in the liquid stream. It is the intent of the electrocoagulation device of this invention to remove the bulk of contaminants in secondary separation treatment. Although some contaminants will fall out of the liquid stream to the bottom of the reaction chamber, it is desirable to treat the liquid within the reaction chamber and then by force of the liquid stream, move the contaminants to a downstream secondary separation treatment point. If the bulk of the contaminants were allowed to settle out of the liquid stream within the reaction chamber, then the reaction chamber would have to be cleaned and serviced more frequently. Secondary separation treatment can be achieved with a number of devices placed downstream of the reaction chamber. For example, secondary separation can be accomplished with clarifiers, filters, centrifugal separators, or centrifuges. Each of these devices can be used within secondary separation as referred to herein, and any one or a combination of these devices may be used depending upon the type of liquid stream treated.

In accordance with another aspect of the present invention, a method is provided for electrocoagulation by electrolytically treating a liquid stream. The method may include the steps of passing the liquid stream through a prefilter and pump, and then through the reaction chamber in an upward flow direction. The method further contemplates the steps of passing the liquid stream through an outlet of the reaction chamber and then through a development chamber and/or secondary separation. Additives can be introduced to the liquid stream in order to target the electrocoagulation of a specific contaminant.

The electrocoagulation chambers in all of the embodiments have the ability to transform the power of the rectified incoming line voltage to the voltage and amperage in the electrical field within the reaction chamber to optimize the electrocoagulation treatment. These transforming electrocoagulation chambers therefore allow the same power supply provided to the electrocoagulation chamber to be used over a wide range of the incoming line voltages. Accordingly, a separate transformer is not required which greatly saves in the cost of implementing an electrocoagulation device. Also, the ability to transform the power grid voltage or incoming line voltage enables the invention to be used in many countries which have differing standard power grid or line voltages.

According to another aspect of the invention, the chamber can be operated under a vacuum. By operation under a vacuum, the gas created by the electrocoagulation process will be removed from the chamber faster. Furthermore, the use of a vacuum upon the chamber will reduce the amount of dissolved air within the liquid stream. There are circumstances in which entrained air impedes the electrocoagulation process, depending upon the type of liquid treated and the contaminants to be removed. Additionally, subjecting the liquid stream to vacuum also enables beneficial gases to be dissolved more efficiently in the liquid stream before or after coagulation. For example, if the amount of oxygen dissolved in the liquid stream needs to be increased, the liquid stream can be passed through a vacuum to remove the dissolved air, then oxygen or ozone can be added back to the liquid stream through a venturi. As another example, carbon dioxide could be added to lower the pH of the liquid stream or ammonia can be used in the same way to increase the pH of the liquid stream. Although a vacuum may be utilized, the apparatus can be operated at atmospheric pressure.

Another benefit of operating the chamber under a vacuum is the removal of volatilized gases and compounds which would normally remain in the liquid stream under higher ambient pressure conditions.

According to another aspect of the invention, a vacuum may be applied to the apparatus of this invention by a vacuum hood which is placed over the reaction chamber or, alternatively, the entire reaction chamber may be placed within a sealed container or pressure vessel which communicates with a source of vacuum. If a pressure vessel is used, not only can a vacuum be applied, but the chamber may be kept in a pressurized state. A pressurized reaction chamber would be advantageous in situations in which the apparatus is placed in line with a municipal water source which is already under pressure. Accordingly, no pump or other external pressure means would be required to move the liquid stream through the device.

In another aspect of the invention, the amperage and voltage within the chamber can be adjusted by placing a non-conductive blade or shield between electrically connected blades. Such a non-conductive blade or shield can be made of plastic or PVC and can be removed or added to the chamber in the same manner as the conductive blades. The voltage and amperage within the electrical field may also be modified by adjusting the surface area of an electrically connected blade in contact with the liquid stream. This is achieved simply by raising or lowering an electrically connected blade in the liquid stream. Thus, the amount of blade surface area exposed is directly related to the amperage that will transfer in the electrical field and through the liquid stream.

In another aspect of the invention, turbulence of the liquid stream may be increased by providing a hydrocyclone or diaphragm-type pump upstream of the reaction chamber. Turbulence increases the efficiency of the electrolytic process. Turbulence may also be increased by injecting air into the liquid stream upstream of the inlet or at the inlet of the reaction chamber.

According to a first preferred embodiment, the device of this invention may be configured for use in the home. Alternatively, the size of the first embodiment may be increased to a greater scale in a second embodiment to handle more industrial-type uses which require greater amounts of treated liquid. In a third preferred embodiment, the apparatus of this invention may be modified in a much smaller scale for portable use. In a fourth preferred embodiment, the apparatus of this invention may be incorporated within a pressure vessel which is able to pressurize or depressurize the environment in which the electrolytic treatment takes place. The third embodiment differs from the other embodiments in that no flow occurs through the device. Rather, a static amount of liquid is treated and then removed for consumption. In yet another preferred embodiment of the invention, the reaction chamber may be configured so that the reaction plate tabs extend through a bottom portion of the reaction chamber. This configuration allows the development chamber to extend directly above the reaction chamber. Also in this additional embodiment, a secondary separation chamber may be attached directly to the development chamber, therefore providing a housing which incorporates all three types of chambers within a single device.

In yet another preferred embodiment of the present invention, the reaction chamber can be especially configured for handling treatment of emulsified oils like slop oil. In this embodiment, the liquid stream to be recovered is the oil and the water is the undesirable substance to be removed. The water separated from the oil is allowed to drain out the bottom of the chamber while the oil is removed from the elevated outlet. Thus, there is separate flow of the oil and water in two distinct flow paths within the chamber. In addition, to slop oil, this embodiment is also especially adapted for desalinating seawater. The salt laden water drains from the bottom of the chamber while the fresher water is removed from the elevated outlet.

For each of the embodiments of this invention, the electrocoagulation chambers do not utilize a torturous flow path. The elimination of a torturous flow path of the liquid stream allows thinner blades to be used because the pressure within the chamber is less. The use of thinner blades allows an increased number of blades to be used within a chamber. By increasing the number of blades within the chamber, the surface area of the blades in contact with the liquid stream is increased which enhances the electrolytic treatment of the liquid stream. In other words, the chemical reactions which take place within the chamber occur on the surfaces of the blades; therefore, increasing the number of blades within a set volume ensures that greater electrolytic treatment takes place. Also, because there is no torturous flow path, gases which are produced in the electrolytic process will not create air locks which could otherwise distort the blades and the chamber, and increase the pressure required to pump a constant liquid stream through the chamber. The simple flow path between the blades from the bottom to the top of the chamber allows the gases created by the electrolytic process to rise as bubbles, as a result of their natural buoyancy, which may then freely escape into the atmosphere or be drawn off by a source of vacuum. Also, the bubbles move in the direction of liquid flow which further prevents clogging and reduces the amount of pressure needed to move the liquid through the device.

Because the total surface area of the blades within the chamber is increased, the electrocoagulation unit can be operated at a minimum power consumption. In general, electrocoagulation treatment is dependent on the amperage in the electrical field which is in contact with the liquid stream. If the voltage is maintained within the electrical field at a threshold level greater than 2 volts, the electrolytic reaction will take place wherein metal ions from the blades are added to the liquid stream causing the blades to be consumed over time. Voltage within the electrical field is usually only a concern if it cannot be maintained above the 2-volt level. The total surface area of the blades within the chambers of each of the embodiments is increased sufficiently to maintain the minimum 2-volt threshold while also maintaining the amperage necessary for effective treatment. In other words, the apparatus of this invention can be operated at lower voltages than the prior art which results in reduced power consumption. There is a direct relationship between the voltage which can be maintained in the electrical field for a given amperage based on the available surface area. An increased surface area allows a specified amperage to be maintained at a lower voltage. For example, if 1 amp were required to effect treatment of the liquid and, if the larger surface areas of the blades of this invention allow the 1 amp to be maintained at 2 volts, then the power used is only 2 watts. If a prior art blade having a smaller surface area, say by tenfold, requires a voltage of 20 volts to maintain the 1 amp, then the power consumption would increase to 20 watts. As discussed above, the surface area available in the device of this invention is much greater than many prior art blades. Typically, prior art blades require precision manufacturing and, therefore, are expensive to make. Furthermore, these prior art blades had to be kept at a minimum size in order to withstand pressure within the reaction chamber. Overcoming this size limitation cannot be solved simply by making the blades thicker as this would in turn decrease available blade surface area within the reaction chamber. Making the prior art blades larger or wider without increasing thickness would require less pressure in the reaction chamber which could result in massive clogging or complete flow disruption. Accordingly, the size of such prior art blades had to be kept at a minimum.

The apparatus of this invention is capable of treating many types of liquids to include, without limitation, water, oil, antifreeze, slop oil, and can be used to desalinate seawater.

The foregoing discussed advantages along with others will become apparent from a review of the description which follows in conjunction with the corresponding Figures.

BRIEF DESCRIPTION OF THE DRAWINGS

FIG. 7 is a perspective view of reaction plates or blades which may be removed and replaced as a single unit;

FIG. 8 is a greatly enlarged fragmentary plan view of a pair of reaction plates which are secured within corresponding spacers within the reaction chamber;

FIG. 9 is a fragmentary perspective view of a fourth embodiment of the invention which utilizes a sealed enclosure or pressure vessel to maintain a desired pressure or vacuum within the reaction chamber;

DETAILED DESCRIPTION OF THE INVENTION

Figure 1:
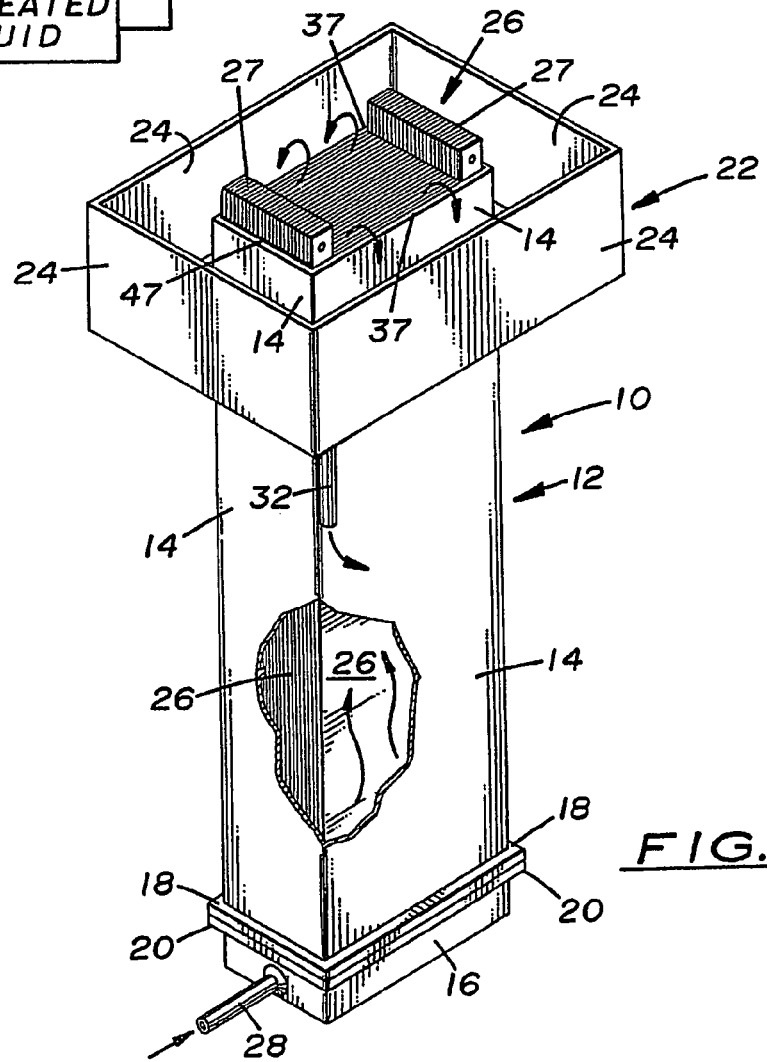
FIG. 1 is a perspective view of an electrocoagulation device of this invention, with a portion of the side wall broken away, according to a first embodiment.
Figure 3:
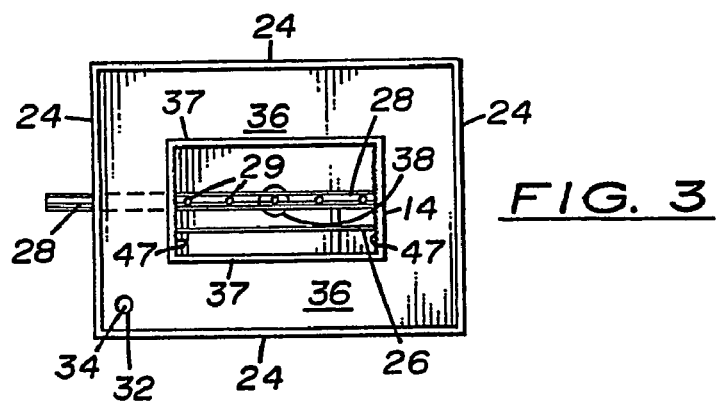
FIG. 3 is a top plan view of FIG. 1 with all of the reaction plates removed except for one plate, for clarity purposes.

FIG. 1 illustrates an electrocoagulation device 10 according to the first embodiment of the invention. This particular embodiment is representative of the type of device which may be used for treatment of water in the home. The device IO includes a reaction chamber 12 defined by side walls 14. A waste collection base 16 is connected to the chamber housing 12 by upper flange 18 of reaction chamber 12 and by a corresponding mating lower flange 20 of the base 16. Disposed above the reaction chamber 12 is a collection chamber or development chamber 22. As shown, the collection chamber 22 is wider and deeper than the reaction chamber 12, but is shorter in height. The collection chamber 22 is defined by a plurality of side walls 24 and a bottom wall 36, as shown in FIG. 3, which attaches directly to side walls 14. A plurality of reaction plates or blades 26 are disposed within the reaction chamber 12. As shown, the reaction plates 26 extend vertically within the reaction chamber and are placed side-by-side so that there are small gaps between opposing faces of each of the plates. Selected reaction plates 26 may have integral plate tabs 27 which extend above the side walls 24. Although FIG. 1 shows each of the reaction plates 26 as having a corresponding plate tab, it will be understood that only selected reaction plates are needed with corresponding plate tabs 27, as further discussed below. An inlet tube 28 allows the liquid stream to enter the device 10 near the bottom thereof. An outlet tube or pipe 32 is provided at the upper portion of the device 10. As shown in FIG. 3, the outlet tube 32 is secured to outlet opening 34 which is formed in bottom wall 36. Accordingly, the flow of liquid through the device is upward through the gaps between the plates 26, over the upper edge 37 of side walls 14 and into the collection chamber 22. The liquid stream then exits through outlet tube 32. As the electrolytic process takes place, it may be necessary to remove some solids or sludge which precipitate out of the liquid stream and which are not carried by the liquid stream out of the reaction chamber. Accordingly, base 16 includes a drain 38 to remove these materials as well as to provide a means to drain the liquid in order to clean or service the reaction chamber. The liquid stream entering the device through inlet tube 28 may be evenly distributed between the reaction plates 26 by a plurality of openings 29 which are disposed along the portion of the tube 28 within the reaction chamber.

Figure 2:
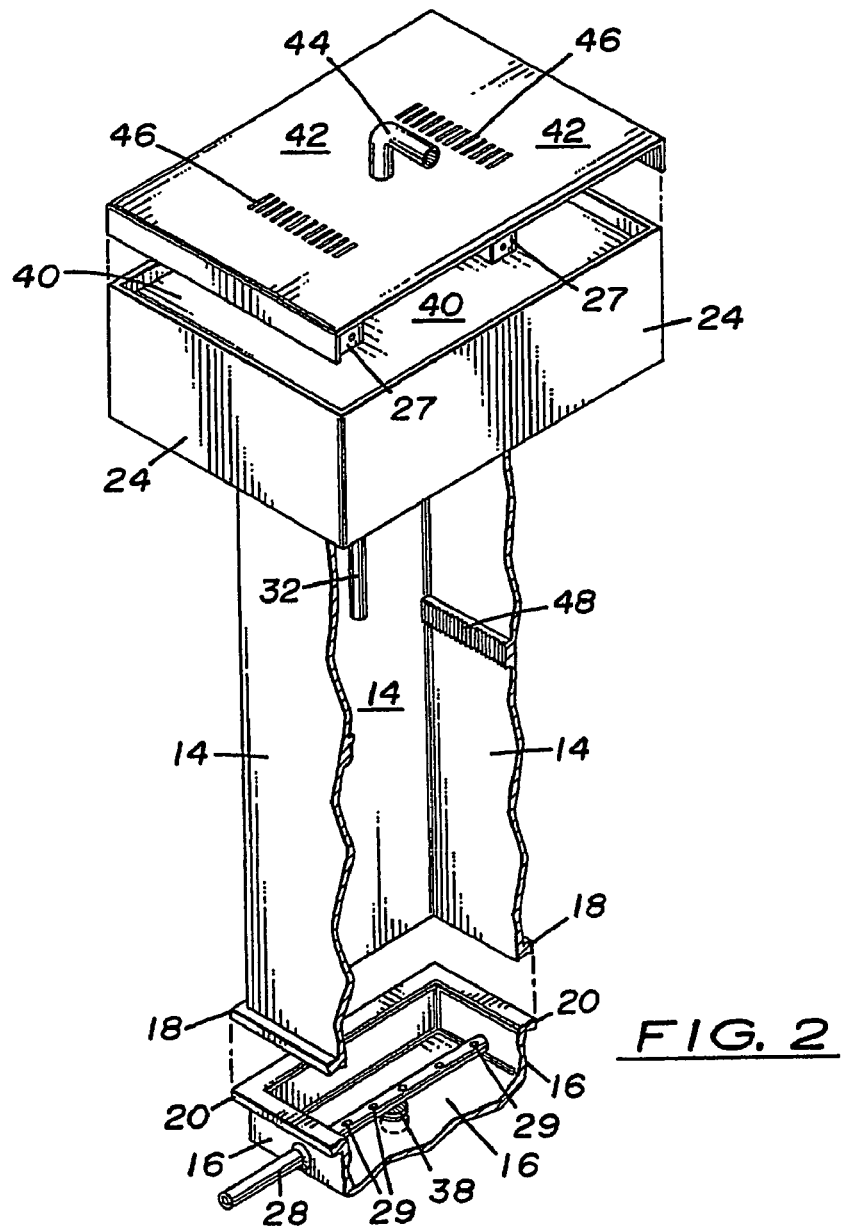
FIG. 2 is a fragmentary perspective view, similar to FIG. 1, but further illustrating the inside of the reaction chamber, and a removable top cover.

As shown in FIG. 2, an optional top cover 42 may be provided to prevent direct access to the reaction chamber. Depending upon the amperage within the reaction chamber, the top cover acts as a safety device to prevent someone from inadvertently making contact with the reaction plates or the liquid stream. Additionally, a foam cover 40 in the form of a flat piece of Styrofoam® or other appropriate material may first be placed over the reaction plates with openings to allow the plate tabs 27 to protrude therethrough. The top cover 42 may also have a continuous opening or plurality of slots 46 in order to allow the reaction tabs to protrude therethrough. A foam extraction tube 44 is also provided to allow the foam to be extracted from the device during operation.

As best seen in FIGS. 2, 3 and 8, a set of upper spacers 47 and a set of lower spacers 48 are provided as guides for the proper positioning of the reaction plates 26. FIG. 3 illustrates all of the blades/plates 26 being removed except for one plate in order to better view the interior of the reaction chamber. As seen in FIG. 8, spacers 47 and 48 are simply slotted guides which allow the ends 49 of the reaction plates to be secured therein. The spacers are made of a non-conductive material. The slotted guides ensure that some gap G is maintained between the plates. As shown in FIG. 8, the plates are substantially parallel to one another.

In the present invention, the liquid pressure which is experienced by the reaction plates 26 is minimal in comparison to most prior art devices. Since the device may be vented to the atmosphere, gases which are produced in the electrolytic process do not add pressure to the liquid pressure produced by the liquid stream. Such gases form as bubbles and rise within the liquid by buoyancy. The bubbles create foam which can be easily removed. Therefore, the strength of the blades is not a significant consideration and more pure metals may be used in the blades which may not have high strength characteristics in comparison to alloys. Additionally, since the reaction plates operate in a lower pressure environment, their life is extended since the plates will not prematurely break apart due to excessive pressure. As discussed above, since the blades may also be made thinner, a greater number of plates may be used within a given volume. Accordingly, the number of gaps between the blades is increased which in turn increases the exposure area of the liquid stream to electrolytic treatment.

In order to remove the reaction plates 26, they may simply be lifted upward and out of the reaction chamber along spacers 47 and 48. The spacers 47 and 48 provide a simple means by which the plates may be secured and replaced without excessive additional hardware which otherwise could make replacement of the plates more difficult.

In order to better facilitate the dislodgement of air bubbles which are created during the electrolytic process, the reaction chamber may be fitted with a device which emits a sonic or radio frequency. This device (not shown) could simply be attached to the side walls 14 and communicating with the interior of the reaction chamber.

Figure 4:
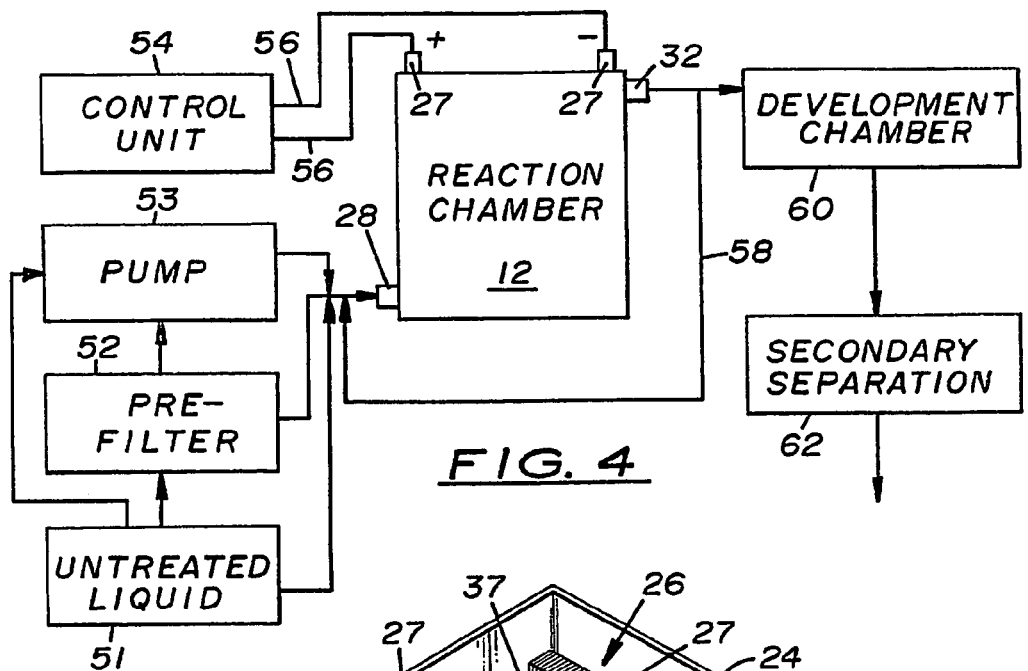
FIG. 4 is a block diagram of the apparatus of this invention illustrating major components according to a generic embodiment.

As shown in FIG. 4, a generic apparatus of this invention is provided in block diagram format to illustrate major components, and also to better illustrate the method of the invention. The untreated liquid 51 may be pumped by pump 53 into the inlet 28, or the untreated liquid may be added directly to the reaction chamber 12 if already under pressure as is the case with municipal water. The untreated liquid 51 may also be passed through a prefilter 52 to remove solids. The liquid stream enters the reaction chamber 12 and undergoes electrolytic treatment. A control unit 54 provides a rectified line voltage to the reaction plates by electrical leads 56. Electrical leads 56 attach to selected plate tabs 27. The liquid stream exits the outlet 32 and may be passed through a development chamber 60. A recycling line 58 can be used to reintroduce a desired portion of the liquid stream for further treatment. In the case of the first embodiment of FIGS. 1-3, the development chamber 60 is in the form of the collection chamber 22 which allows foam produced by the rising gases to be removed. In other embodiments, the development chamber 60 provides additional opportunity for the liquid stream to be treated with additives or other chemicals to condition the liquid for ultimate use. Secondary separation means 62 may be placed downstream of the development chamber 60 in order to separate and filter out contaminants or coagulated materials prior to use of the treated liquid stream.

Figure 5:
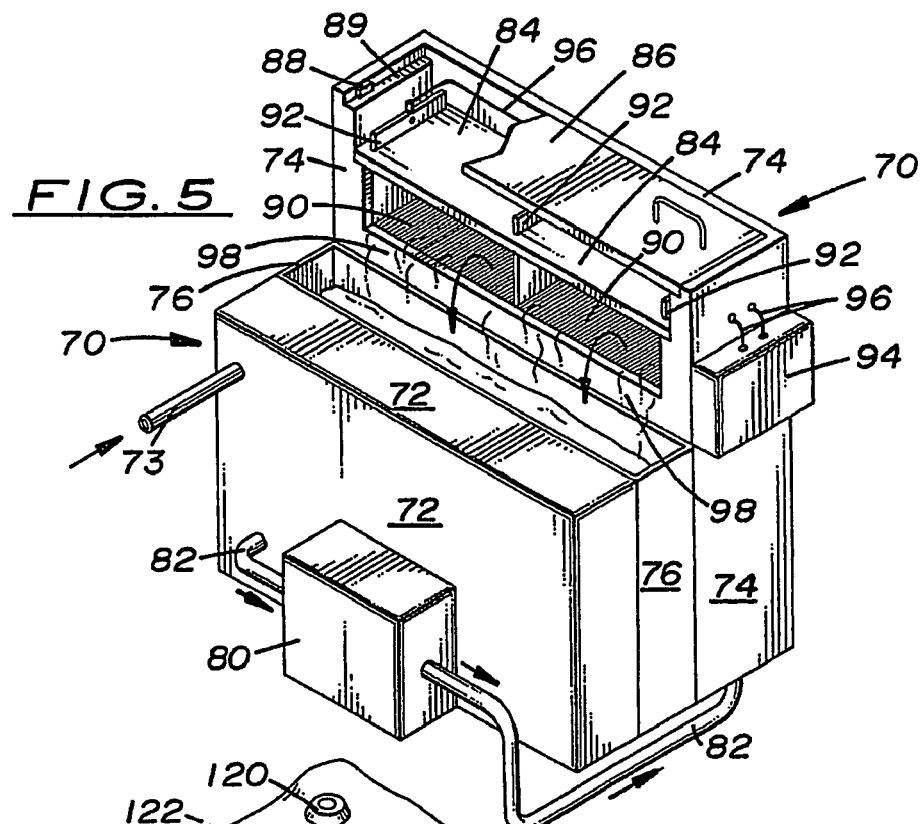
FIG. 5 is a greatly reduced scale perspective view of a second embodiment of the invention which may be used for high volume production in industrial settings.

FIG. 5 illustrates a second preferred embodiment of the apparatus of the invention. This embodiment operates under the same principles as the first embodiment, but simply illustrates an alternative arrangement which is more suited for situations in which high volumes of treated liquids are required in industrial settings. As shown, the electrocoagulation device 70 of this embodiment includes a raw or untreated liquid tank 72 which receives a supply of liquid through inlet 73. A reaction tank 74 and a treated liquid tank 76 are arranged side-by-side with the untreated liquid tank 72. A pump 80 forces the untreated liquid through pump lines 82 into the reaction tank 74. A foam cover 84 and a safety top cover 86 are positioned over the reaction tank 74 as shown. A safety switch 88 may be incorporated within the upper lip 89 of the reaction tank 74 in order to warn a user if the top cover is removed. The safety switch 88 may be any industrial contact or limit switch which is wired to the control unit 94. As shown, the control unit 94 is mounted to the reaction tank 74 for easy access. Reaction plates 90 are placed within the reaction tank 74 and, like the first embodiment, extend vertically through the reaction tank and are positioned in spaced apart relation. There are an increased number of plates in this embodiment in comparison to the first embodiment. Accordingly, this embodiment will require a higher incoming line voltage such as 440 volts which is readily available in most industrial settings. The first embodiment would normally operate at 110 volts incoming line voltage which is the most common incoming line voltage for residential areas. Spacers like those used in the first embodiment (spacers 47/48) can also be incorporated within this embodiment to secure the plates. A plurality of reaction plate tabs or extensions 92 extend above the foam cover 84. Electrical leads 96 extend from the control unit 94 and attach to the reaction plate tabs or extensions 92. As with the first embodiment, selected ones of the reaction plates 90 may be provided with the reaction plate extensions 92 in order to create the desired amperage and voltage within the electrical field of the reaction tank. A wier or spillway 98 allows the liquid stream to exit the reaction tank 74. The foam cover allows the reaction plate extensions 92 to pass therethrough, but forces the foam and liquid stream to flow out of the chamber over the spillway 98. The top cover 86 will cover all of the electrical connections for safety purposes. The electrical leads 96 may connect to the respective reaction plate extensions by any well-known means such as alligator clips or connecting terminals that are used on industrial batteries. The open area between the foam cover 84 and the spillway 98 allows the foam to be vacuumed off or otherwise removed as desired. The treated liquid accumulating within the treated liquid tank 76 may be stored or removed as needed.

Figure 6:
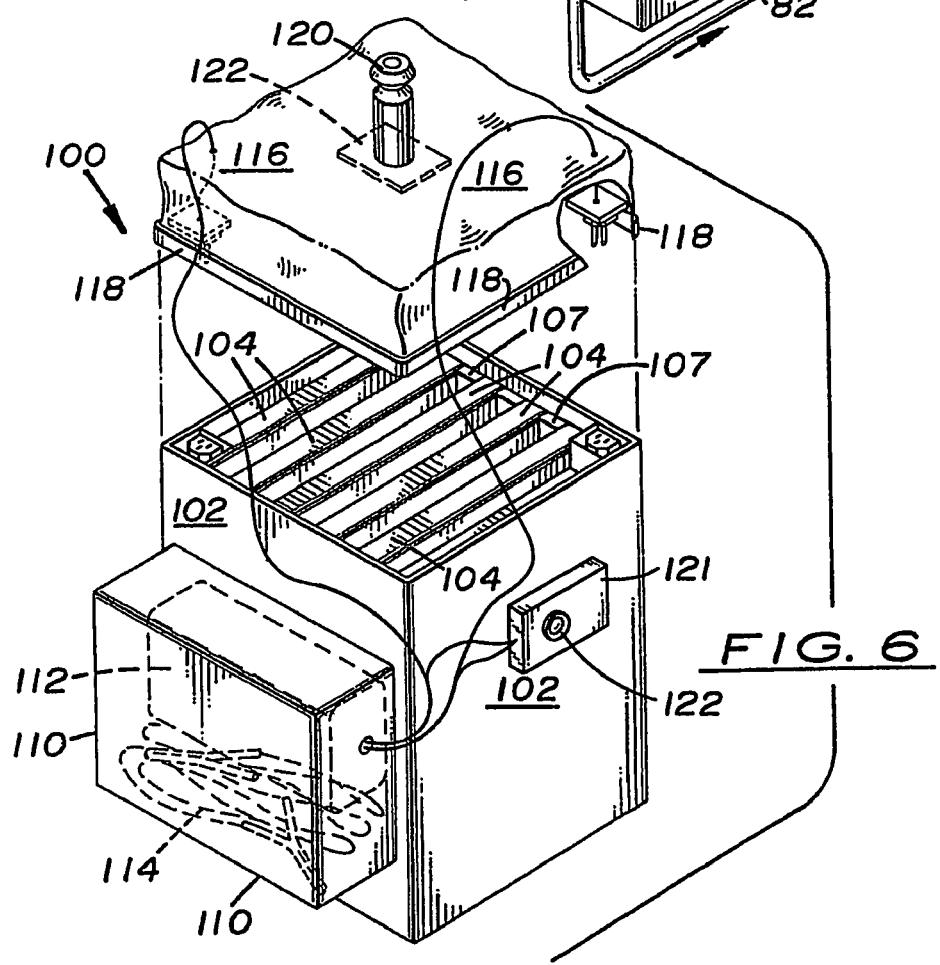
FIG. 6 is an exploded perspective view of a third embodiment of the invention in the form of a portable or travel unit.

In a third preferred embodiment of the invention, a portable electrocoagulation device 100 is provided as shown in FIG. 6. This portable device 100 may be used in those circumstances in which there is no potable water available and a small amount of water is needed for drinking, cooking or other similar purposes. This embodiment differs from the previous embodiments in that there is no liquid flow through the device, rather, treatment of a static and predetermined amount of liquid is achieved. The device 100 includes a reaction chamber 102 which houses a plurality of reaction plates 104 which extend vertically through the reaction chamber and are spaced apart from one another. Selected reaction plates 104 may include tabs 106 that extend above the upper surfaces of the plates 104. Spacers/dividers 107 are provided to maintain the reaction plates in their spaced apart relation. The tabs 106 each include integral electrical terminals 108 in the form of an electrical receptacle part. A top cover 116 having a sealing means 118 around the lower edge thereof is used to cover the device 100. An accessory housing 110 is mounted to the reaction chamber. The accessory housing 110 may include a voltage source, such as a battery 112. Electrical leads 113 interconnect the battery 112 with electrical receptacle parts 109 that are mounted to the underside of the top cover 116. When the top cover 116 is mounted over the device 100, electrical receptacle parts 108 and 109 align and mate with one another thus completing an electrical connection between the battery 112 and the tabs 106. Electrical receptacle parts 108 could be male receptacles, while receptacle parts 109 could be female receptacles, as shown. Receptacles 108 and 109 help to protect a user from a potential shock hazard by isolating the electrical connections from contact with the user. The accessory housing 110 may also be used to store additional electrical cables or leads 114 which could be used to interconnect a source or power to the device 100, such as from a vehicle battery After the liquid has been treated, the liquid may be extracted through spout 120. A filter 122 is provided to filter out any solids or contaminants. As shown, the filter 122 may simply be attached to the inside surface of the top cover 116. The top cover 116 may be made of a flexible material, and the sealing means 118 may be in the form of a Tupperware® type seal to prevent leakage of liquid.

In operation of the portable electrocoagulation device 100, the top cover is removed, the liquid is simply added to the reaction chamber 102 and the voltage is introduced to the reaction plates 104 by battery 112, or another power source interconnected by cables 114. The electrolytic process is allowed to occur over a predetermined period of time based upon the type of liquid being treated and the targeted contaminants to be removed. The treated liquid is then accessed by opening spout 120. In order to more easily remove the treated liquid, a small pump 121 may be provided which is mounted to the chamber 102. The pump would pressurize the chamber enabling liquid to pour through the spout 120 more easily. The pump 121 could be a manual primer pump, similar to those used to prime the combustion chambers in small engines. Accordingly the pump 121 is shown as including a button 122 which is depressed repeatedly until the chamber is so pressurized to allow liquid to pour from the spout. Alternatively, the pump 121 could be an electrically powered pump, and the battery 112 could be used to power the pump.

It is contemplated that this particular embodiment would be capable of treating at least 9 oz of water per batch. This embodiment preferably contains six reaction plates or blades which are removable. The filter 122 may be a 16-24 micron filter which is also removable for cleaning. This portable electrocoagulation unit has effectively treated water from an outdoor stream to produce a pathogen free water. In one laboratory test, total coliform, *E. coli*, and *enterococcus* were all reduced to acceptable levels (less than 10 most probable number (mpn)) wherein such pathogens originally were found at 12,000, 120 and 83 mpn, respectively. In addition to the pathogens discussed above, it is well-known in the art that electrocoagulation and filtration is also effective in the removal of metal ions, suspended solids, pesticides, herbicides, and colloidal particles.

As shown in FIG. 7, when it is necessary to remove and replace the blades/reaction plates in any one of the embodiments, either individual blades or the entire set of blades used within the device can be removed. If the entire set of blades is be removed, a plurality of non-conductive rods 126 can be used to interconnect the reaction plates. The non-conductive rods 126 could be sized to fit within the specific reaction chamber used. These rods would serve not only to stabilize the plates within the reaction chamber, but also to keep the reaction plates separated from one another the desired gap G. For illustration purposes, the gap G between the respective reaction plates 26 has been increased in order to better illustrate how the reaction plates can be secured to one another through the rods 126. Use of non-conductive rods 126 would eliminate the need for use of spacers 47/48. As also shown in FIG. 7, the orientation of the reaction plates can be configured such that plate tabs 27 are positioned to allow easy connection to the electrical leads. Placing the tabs in an alternating arrangement helps to prevent the leads from becoming crossed or tangled.

Yet another embodiment of the apparatus of this invention is shown in FIG. 9. In this embodiment, the electrocoagulation device 130 can be maintained in a pressurized or depressurized environment by a reaction chamber housing 132 which is completely sealed from the environment. The reaction chamber housing 132 can be any well-known type of pressure vessel which is able to withstand both pressure and vacuum. This particular embodiment is advantageous for use in those situations in which the liquid stream is found in a pressurized state, such as a municipal water supply. Use of the reaction chamber housing 132 would therefore eliminate the need for a pump or some other means to force the liquid stream through the device 130. The principle of operation for this particular embodiment is the same as the first and second embodiments wherein a liquid stream passes through the device. A plurality of reaction plates 134 extend vertically through the reaction chamber, and are in spaced apart relationship. A selected number of reaction plate tabs or extensions 136 extend upwardly beyond those reaction plates 134 without tabs. An inlet 138 communicates with the bottom portion of the reaction chamber housing 132. A foam dome or chamber 140 is disposed above the reaction chamber housing 132 in a sealed relationship therewith. A foam extraction pipe 142 communicates with the upper end of the foam dome 140. A liquid stream outlet 144 is attached to the foam dome 140 above the reaction chamber 132 and below the foam extraction pipe 142. As the liquid stream exits the reaction chamber through outlet 144, it may then be passed through a venturi 146 in order to add a desired gas to the liquid stream such as oxygen. A venturi feed line 148 allows the desired gas to enter venturi 146. Accordingly, the downstream side of the venturi 146 at pipe 149 contains a mixture of the treated liquid stream and the added gas from feed line 148. The addition of oxygen or other gases may help in the treatment of the liquid stream. In addition to a particular gas, chemicals or other agents may be added to the liquid stream at this point to further treat the liquid. A control unit 150 provides a rectified line voltage to the reaction plates by means of electrical leads 152. Electrical leads 152 connect with sealed connections 154 which are electrically coupled to their corresponding reaction plate tabs 136. Although only a pair of reaction plate tabs 136 are illustrated, it shall be understood that the amperage and voltage within the reaction chamber may be altered as with the previous embodiments by providing additional sealed connections 154 in conjunction with corresponding selected reaction plate tabs 136. These sealed connections 154 make contact with leads 152 externally of the reaction chamber housing 132. The electrocoagulation device of FIG. 9 may be followed downstream by a development chamber and a three-phase centrifugal separator (not shown) or a back washing filter (not shown). This type of treatment is ideal for a home, hot tub or any application where liquid treatment is needed in a pressurized system. Contaminants can be removed from the liquid stream and the cleaned liquid can flow as needed without disruption.

A source of vacuum (not shown) may be connected to foam pipe 142 to assist in removing foam which builds up within foam dome 140. The foam created by the electrolytic process will collapse, thus reducing its volume during extraction through pipe 142. Application of such a vacuum may also be used to assist in the removal of contaminants from the liquid, before, during or after electrocoagulation, or to enable a greater saturation of beneficial gases in the liquid. For example, the liquid stream within the reaction chamber could be saturated with a particular gas such as oxygen or carbon dioxide which is provided by another inlet formed in the reaction chamber (not shown), or the gas could be added directly to the existing inlet. Use of the vacuum to create a lower pressure environment would allow such gases to more fully saturate the liquid stream as it passes through the coagulation chamber. The foam dome 140 may also serve as a distillation tower allowing the separation of various components from the liquid stream. In each of the embodiments, the shape of the blades is not critical. Although the preferred embodiments illustrate the blades as having rectangular shapes, it shall be understood that they can be modified to fit the particular shape and size of the reaction chamber being used. The bottom ends or portions of the blades may be tapered with respect to the upper ends or upper portions. Tapering of the blades in this manner makes the blades easier to remove and replace within a reaction chamber. Also, while the blades of this invention are illustrated as being substantially planar, it will be understood that the apparatus and method of this invention do not require the blades to be of any particular shape. The major concern with regard to the shape of the blades is that the blades will allow the liquid stream to move through the reaction chamber in primarily an upward manner so that gases produced in the electrolytic reactions can be removed from the liquid stream. Therefore, it is not the intent to provide horizontal or cross flow through the reaction chamber by the use of apertures or openings in the plate, as is the case with many prior art devices. However, it will be understood that openings or apertures can be a feature of the blades of this invention which will not create the horizontal or cross flow. For example, the plates could be manufactured from a screen-like material wherein there are a number of openings or holes along the length of the blade. Again, however, the purpose of these holes or openings are not for inducing horizontal flow, but are rather for purposes of providing flexibility in the type of material to be used as the blades. It is even contemplated within the scope of this invention that a heap or pile of metallic material could be placed within the chamber and which would allow the desired electrolytic reactions to take place without inducing undesirable horizontal flow.

In the preferred embodiments, the spacing of the blades may be as close as 1/8". The closer the blades are together, the greater the surface area made available for electrocoagulation to occur within a given volume. However, the closer the blades are placed together, the more difficult it becomes to force liquid through the gaps between the blades, and the more likely that clogging could occur between the blades by bridging of solid particles or sludge. The thickness of the blades is also a practical consideration, the thinner the blades, the greater surface area available for electrocoagulation treatment within a given volume. If the blades are too thin, then their increased flexibility make them harder to install. Also, if the liquid being treated requires the addition of metal ions from the blades, then thicker blades are able to sacrifice metal ions over a longer period of time before dissolving. As the blades dissolve, they look similar to a window screen with irregular holes. The electrocoagulation process continues as long as there is a surface for the reaction to occur. With each of the embodiments of this invention, an adequate thickness of the blade is 1/8". The blades can be made of aluminum, iron, stainless steel, carbon or any conductive material. The choice of blade material is based upon the liquid to be electrocoagulated, the contaminants to be removed from the liquid stream, the material desired to be left within the liquid stream, and the material to be precipitated out as sludge.

In lieu of the insulated spacers 47/48 and 107, non-conductive strips of material or washers may be placed between the blades. These alternate type of spacers may be held in place by non-conductive bolts or other non-conductive hardware. The gaps or spaces created between the blades do not necessarily have to be exactly parallel or uniform. The electrocoagulation process is flexible, and as long as a surface area is provided for contact with the liquid stream, then the electrocoagulation process can occur. As a practical matter; however, it is desirable to avoid choke points or comparatively narrow gaps to prevent undesirable bridging of solid particles.

In the first, second and fourth embodiments, the electrically connected blades rise up past the liquid line and foam discharge, and pass through the foam cover and top cover to prevent foam or liquid from reaching the plate tabs. In the third embodiment, the top cover is removed during treatment, but the plate tabs are still maintained above the liquid line to keep them dry. It is necessary to keep the tabs dry so that corrosion does not occur.

In each of the embodiments, the electrocoagulation device of this invention may also allow a portion of the liquid stream to bypass the electrical field between the blades without sacrificing the ability of the device to effectively treat the liquid stream. The liquid that does not pass through the electrical field will still carry electrons because of the contact with liquid that has passed through the electrical field. For example, since the device of this invention does not require precision cut blades and the blades are intended to be removable from spacers 47 and 48, a small portion of the liquid stream could bypass the electrical field by traveling through small gaps between the blade ends 49 and the spacers. Therefore, effective treatment of the total volume of the liquid stream is still achieved as mixing occurs naturally throughout the reaction only require exposure of a small portion of the total liquid within the electrical field, and then the treated and non-treated liquids are mixed to effect a suitable treatment for the overall total volume of liquid. Accordingly, as shown in FIG. 4, the development chamber which is downstream of the reaction chamber may be used for purposes of further mixing treated and non-treated portions of the liquid stream which are not mixed during flow through the reaction chamber.

As briefly explained above, the electrocoagulation chambers utilized in the various preferred embodiments of this invention have the ability to transform the incoming rectified line voltage or power grid voltage to optimize the electrocoagulation treatment. Traditionally, prior art coagulation devices use a separate transformer to take the incoming line voltage, then rectify and transform the line voltage to a voltage or group of voltages at which the reaction chamber can operate efficiently. In the present invention, power is obtained directly from the incoming line voltage or power grid, is rectified through a common diode or rectifier within the control unit, and is then transferred directly to the electrocoagulation chamber. Transformers of the type needed to transform incoming line voltage to usable voltages within a reaction chamber are extremely expensive and, therefore, add a major cost to the overall cost of manufacturing an electrocoagulation device. Also, such transformers are extremely heavy which makes transport and installation more difficult. When a traditional transformer is used to lower the incoming line voltage to a level acceptable for use in an electrocoagulation device, the amperage necessary to treat the liquid stream must be transferred from the transformer to the chamber at a lower voltage. Because electrical wires are rated, or sized, based upon amperage specifically, and voltage generally, the size and cost of a wire capable of safely conducting low voltage and high amperage is much greater than wire used to move high voltage and low amperage. That is why power companies move electricity through a power grid from a generation point at high voltages and low amperages, and then transform the power to low voltages and high amperages near the point of use (i.e., the home or factory location). Therefore, size and cost advantages can be obtained by conducting electricity at a higher voltage and lower amperage.

The potential between the incoming power or line voltage and the blades within the reaction chamber for each of the embodiments can be transformed generally in accordance with the following:

voltage of 440 volts AC to 560 volts DC (according to standard formulas for rectifiers wherein the rectified DC voltage equals the AC voltage multiplied by the square root of 2 and minus 10% rectifier loss). The leads 164 and 166 attach to respective reaction plate tabs above the liquid line so that the connections are made in a dry location. Using Ohm's law where voltage equals amperage multiplied by resistance, and assuming the resistance is equal to the distance between the blades with voltage connections, the following table can be generated:

TABLE 1

Transforming By Attaching Leads To Selected Blades

| Example No. | Blade With Positive Lead Attached | Blade With Negative Lead Attached | Amperage Between Blades | Voltage Between Blades | Incoming Line Amperage |
|---|---|---|---|---|---|
| 1 | #1 | #219 | 10 | 2.6 (560/218) | 10 |
| 2 | #1 & 219 | #110 | 20 | 5.1 (560/109) | 40 |
| 3 | #1 & 146 | #73 & 219 | 30 | 7.7 (560/72) | 90 |
| 4 | #1, 110, & 219 | #55 & 126 | 40 | 10.4 (560/54) | 160 |
| 5 | #1, 87, & 174 | #44, 131, & 219 | 50 | 13.0 (560/43) | 250 |
| 6 | #1, 73, 145, & 219 | #36, 109, & 182 | 60 | 16.0 (560/35) | 360 |
| 7 | #1, 62, 125, & 187 | #31, 93, 156, & 219 | 70 | 18.7 (560/30) | 490 |
| 8 | #1, 55, 109, 164, 219 | #27, 82, 136, & 191 | 80 | 21.5 (560/26) | 740 |

1. Voltage delivered to the chamber with power connections to the first and last blade (Nos. 1 and 219, as described further below) results in transformation of the incoming line voltage as follows: The voltage within the chamber will be the incoming line voltage divided by the number of the gaps between the blades. The amperage draw in the chamber will be the amperage coming from the incoming line voltage.

2. Voltage delivered to the chamber with power connections to every blade, alternating between positive and negative leads (Table 2 below) results in transformation of the incoming line voltage as follows: The voltage within the chamber will be the incoming line voltage and the amperage will be the total amperage coming from the incoming line voltage divided by the number of gaps between the blades.

3. The amount of amperage pulled from the incoming line voltage can be controlled by adjusting the surface area of the electrically connected blades. There is a linear relationship between the surface area and the amperage pulled; for example, amperage will be doubled if the surface area of the electrically connected blades in contact with the liquid is doubled.

4. The amperage and voltage created within the chamber may be controlled by connecting the incoming line voltage to the blades in any combination as described above in Nos. 1, 2, and 3. As shown in Table 1, this allows for a wide range of amperage and voltage control between the blades.

Figure 10:
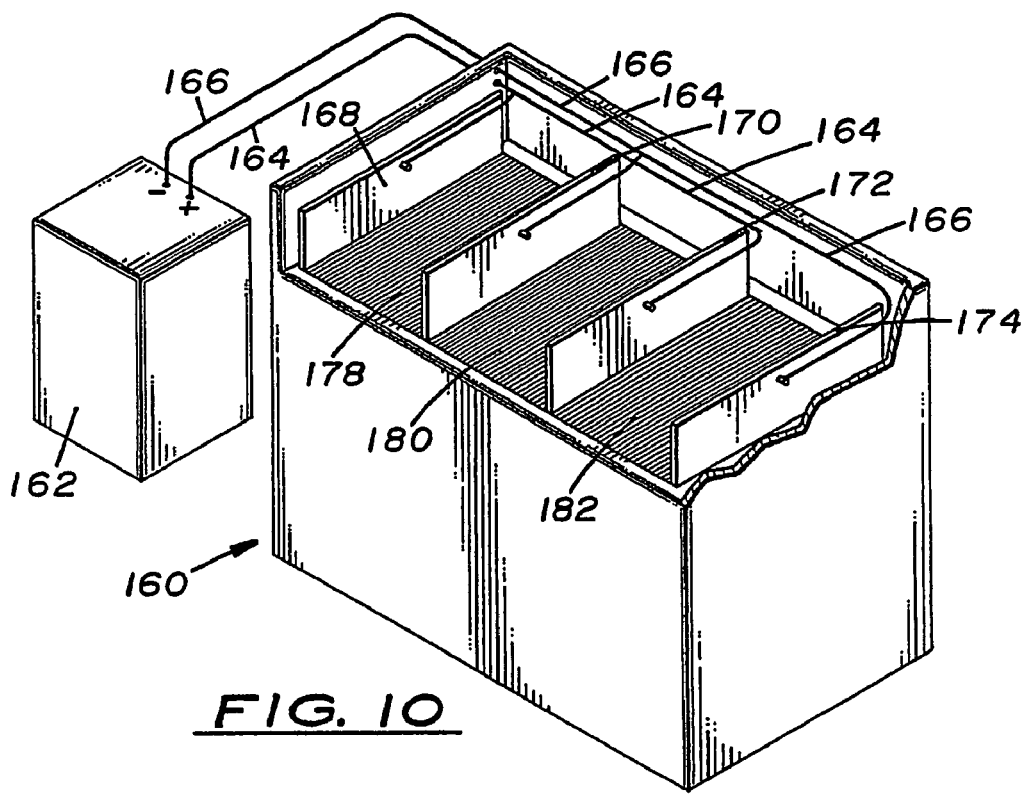
FIG. 10 is a fragmentary perspective view of a generic reaction chamber and one example of how selected reaction plates may be connected to an incoming rectified line voltage to produce a desired voltage and amperage within the electrical field of the reaction chamber.
Figure 11:
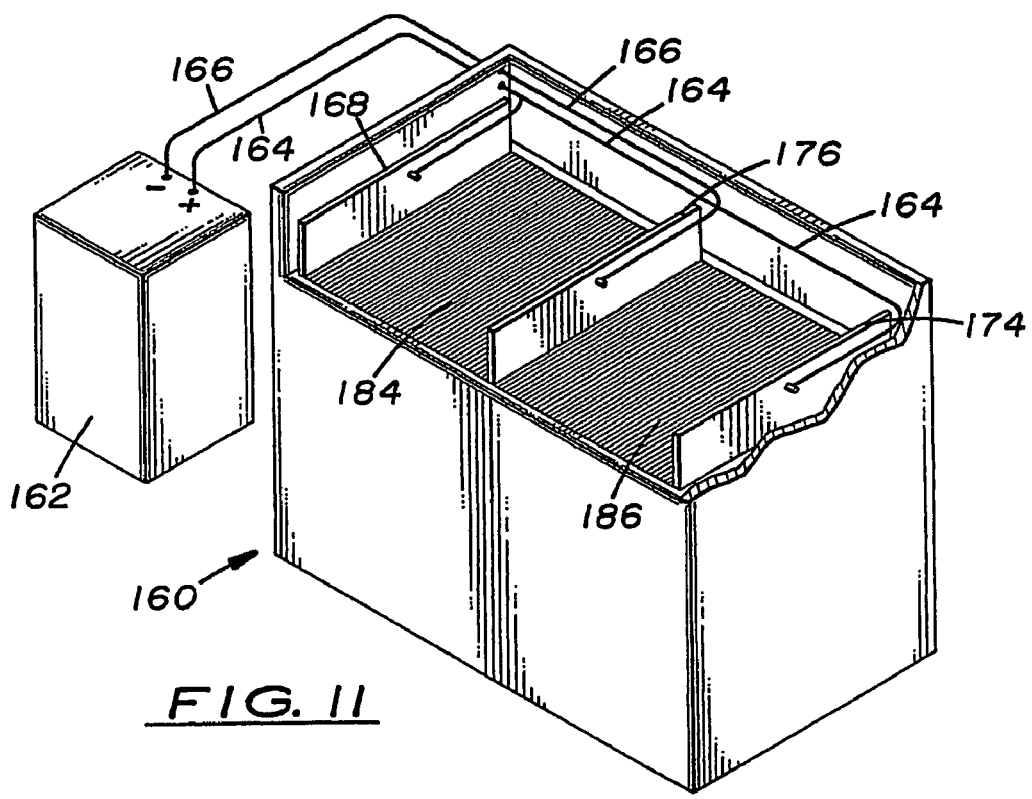
FIG. 11 is another fragmentary perspective view of a generic reaction chamber with reaction plates which are connected to the incoming line voltage in a different configuration in order to provide a different voltage and amperage within the electrical field of the reaction chamber.

A set of practical examples will now be described in terms of how the electrocoagulation device of this invention may transform incoming line voltage to the amperage and voltage needed within the electrical field. Referring to FIGS. 10 and 11, and Table 1 below, a reaction chamber 160 includes a plurality of reaction plates or blades. A control unit 162 provides the incoming rectified line voltage by means of positive lead 164 and negative lead 166. There are a total of 219 blades within the chamber made of ⅛" aluminum strap, and spaced ⅛" apart. The blades of this example could be approximately 6" wide and 48" long. Assuming that the incoming line voltage is traditional three-phase 440 volts AC, a diode or rectifier within the control unit 162 rectifies the line FIG. 10 illustrates the electrical connections between the control unit and the reaction chamber according to example 3 of Table 1. As shown, positive lead 164 is attached to blades 168 and 172, which correspond to blade numbers 1 and 145, respectively. The negative lead 166 is attached to blades 170 and 174 which correspond to blade numbers 73 and 219. With this connection configuration, the amperage between each of the blades is 30 amps. The voltage between each of the blades is 7.7 volts (rectified DC voltage of 560 volts divided by the number of gaps between pairs of blades having power applied thereto which in this case is 72). In other words, power is applied to blade numbers 1, 73, 145 and 219, which effectively splits the chamber into three major areas denoted by reference numbers 178, 180 and 182. Therefore, 219 divided by 3 separate area equals 72 gaps between pairs of electrically connected blades, and 560 divided by 72 equals 7.7. Also as shown in Table 1, the electrocoagulation chamber will pull 90 amps form the incoming line voltage source.

FIG. 11 illustrates the connections corresponding to example 2 of Table 1, as shown, the positive lead 164 is attached to plates 168 and 174 corresponding to plate number 1 and 219, respectively. The negative lead 166 is attached to blade 176 corresponding to blade number 110. Accordingly, the amperage between each of the blades is 20 amps, the voltage between the blades is 5.1 volts (560 volts divided by 109). In other words, the voltage between the blades is the supplied DC voltage divided by the number of gaps between pairs of electrically connected blades. As shown in FIG. 11, placement of the electrical leads at blade numbers 1, 110 and 219 effectively splits the chamber into two major areas shown as areas 184 and 186. Also in this example, the electrocoagulation chamber will pull 40 amps from the incoming line voltage source. Table 1 shows eight different types of connections which can be used to obtain different voltages and amperages within the reaction chamber. It is apparent that other voltages and amperages can be created within the reaction chamber by developing other connection configurations.

Table 2 below illustrates the method by which prior art devices are configured for providing an incoming line voltage source to a reaction chamber. As shown, an electrical connection must be made with each of the blades within the chamber. A separate transformer then is used to provide differing incoming line voltages to the chamber. As shown, the creation of 2.6 volts between each of the blades requires the chamber to pull high levels of amperage from the incoming line voltage source. This greater amperage pull requires much larger conductors to be used for transferring power to the blades in comparison to the apparatus of this invention. Additionally, such a prior art devices is more complex and expensive to manufacture because of the great size and number of electrical connections required.

TABLE 2

Prior Art
Transforming By Attaching Leads to Each Blade

| Example No. | Blade With Positive Lead Attached | Blade With Negative Lead Attached | Amperage Between Blades | Voltage Between Blades | Incoming Line Amperage |
| --- | --- | --- | --- | --- | --- |
| 1 | Odd numbered | Even numbered | 10 | 2.6 | 2,180 |
| 2 | Odd numbered | Even numbered | 20 | 5.1 | 4,360 |
| 3 | Odd numbered | Even numbered | 30 | 7.7 | 6,540 |
| 4 | Odd numbered | Even numbered | 40 | 10.4 | 8,720 |
| 5 | Odd numbered | Even numbered | 50 | 13.0 | 10,900 |
| 6 | Odd numbered | Even numbered | 60 | 16.0 | 13,080 |
| 7 | Odd numbered | Even numbered | 70 | 18.7 | 15,260 |
| 8 | Odd numbered | Even numbered | 80 | 21.5 | 17,440 |

It is also contemplated that the device of this invention can be used within hazardous areas. The electrical connections between the control unit and the reaction chamber could be insulated in order to conform to standards for explosion-proof devices. For example, the electrical connections at the blades could be insulated to include an insulated coating placed over the electrically connected blades to a level just below the liquid line within the reaction chamber.

With the electrocoagulation device of this invention, the power supplied to the control unit is set by the incoming line voltage, and the amperage draw is controlled within the electrocoagulation chamber. The amperage within the electrically connected reaction chamber can be controlled by (1) adjusting the surface area of the electrically connected reaction plates or blades in contact with the liquid stream; (2) adjusting the distance between the electrically connected blades; (3) the addition of non-conductive insulating blades; and (4) adjusting the conductivity of the liquid by adding chemicals which either enhance or degrade the ability of the liquid to transfer electrons. Amperage can be also be controlled by providing a switch between the incoming line voltage and the reaction chamber which cycles the power "on" and "off."

As a further discussion of (1) above, the amperage draw can be controlled inside the reaction chamber by adjusting the liquid contact length of the electrically connected blades. Using Table 1, Example 1, a blade 6" wide and 48" long draws 10 amps with a specific liquid. The amperage draw of the reaction chamber would be reduced by shortening blade No. 1 or blade No. 219. The amperage draw would be reduced to 7.5 amps if blade No. 1's length was reduced to 36". The amperage draw would be reduced to 5 amps if blade No. 1's length was reduced to 24". Therefore, there is a linear relationship between the amperage draw and the liquid contact length of the electrically connected blades. The amperage draw can be controlled in the same way by placing a non-conductive blade between electrically connected blades. There is no particular requirement in terms of the placement of such a non-conductive blade; only that it be placed between designated electrically connected blades. The non-conductive blade will reduce the conductivity between the plurality of blades in the reaction chamber in the same proportion as removing an electrically connected blade from contact with the liquid. For example, the amperage draw in the above example would be reduced to 7.5 amps if a non-conductive blade of 12" in length were placed in contact with the liquid in the reaction chamber between blades Nos. 1 and 219. The amperage draw would be reduced to 5 amps if a non-conductive blade 24" long were placed between blade Nos. 1 and 219, and amperage draw would be reduced to 2.5 amps if a non-conductive blade 36" were placed between blade Nos. 1 and 219. The lengths of the electrically connected or non-conductive blades can be adjusted in the liquid manually, or mechanically. For example, the interior surface of the electrocoagulation chamber housing could be provided with a plurality of vertically adjustable flanges which can be selectively placed at different levels within the reaction chamber and aligned with a particular electrically connected blade. The blade could be secured to these vertically adjustable flanges to effectively increase or reduce the surface area of the electrically connected blade in contact with the liquid.

In the first, second and fourth embodiments, the flow of the liquid stream through the chamber could be increased or decreased to further control the amperage within the reaction chamber. Generally, increased flow of liquid through the chamber will result in an amperage decrease because metal ions from the blades will be removed more quickly thereby decreasing the conductivity of the liquid. As discussed above, the control unit may be equipped with an ammeter to monitor amperage within the chamber. The control unit can then control an increase or decrease in the flow rate of the liquid stream through the device by controlling a valve or variable speed pump upstream of the inlet.

In each of the embodiments, the blades over time may be coated with a non-conductive coating or scale. The coating can be removed from the blades by reversing the polarity of the DC power to the electrically connected blades. Accordingly, this invention contemplates switching the polarity of the DC voltage provided to the blades by the control unit according to a timed sequence or based on increased amperage which indicates lower conductivity due to the scaling.

In order to obtain the varying amperages and voltages in Table 1, only nine blades are required to have plate tabs. Since the blades are easily removable, the blades or plates having tabs can be moved to the desired locations within the reaction chamber. The foam cover that slips over the top of the blades through slots cut in the cover will expand allowing the blade to pass through. When a blade is removed, the foam cover will expand to form a water tight seal at the slot.

For the first, second and fourth embodiments, although a top cover is recommended for safety purposes, the devices will operate without a top cover as long as the connections of the electrical leads occur above the liquid line, thus eliminating typical corrosion problems associated with wet electrode connections.

Figure 12:
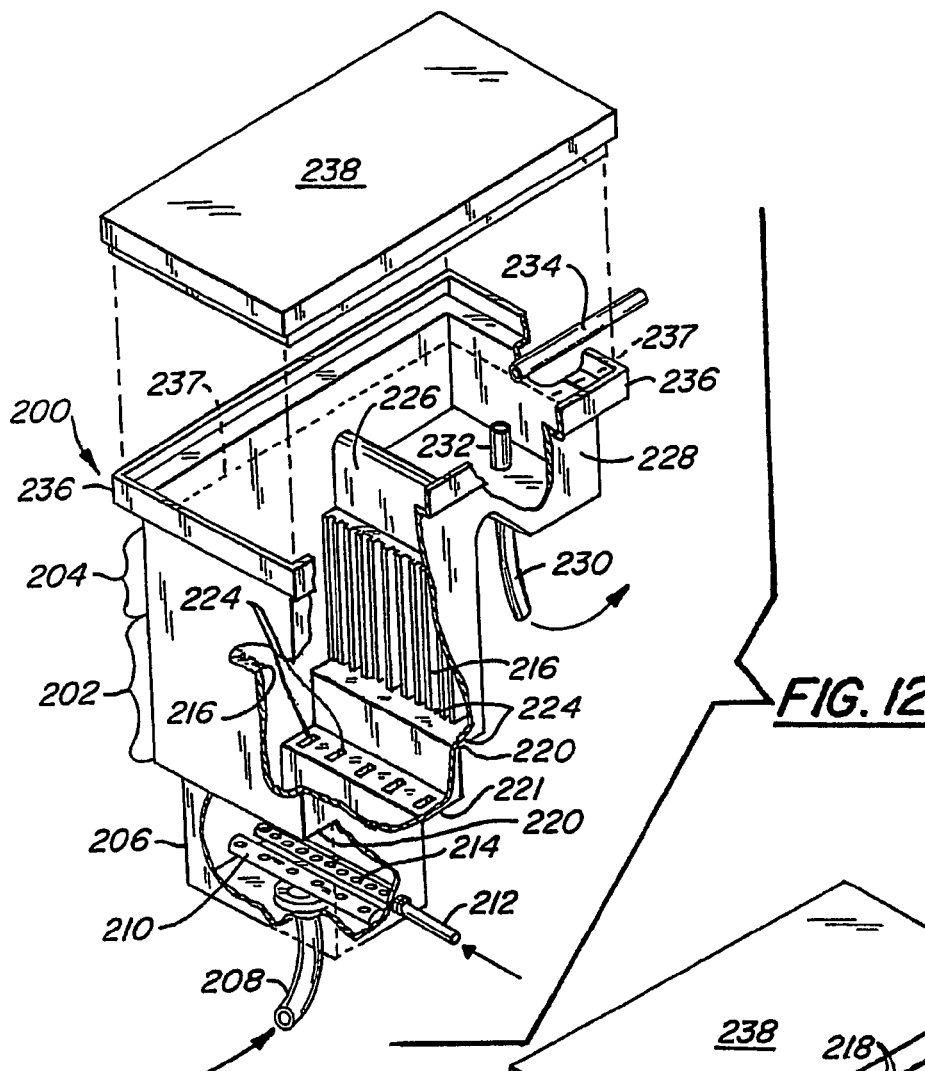
FIG. 12 is a fragmentary perspective view of another preferred embodiment of the invention with portions of the electrocoagulation device broken away to better illustrate the features therein.
Figure 13:
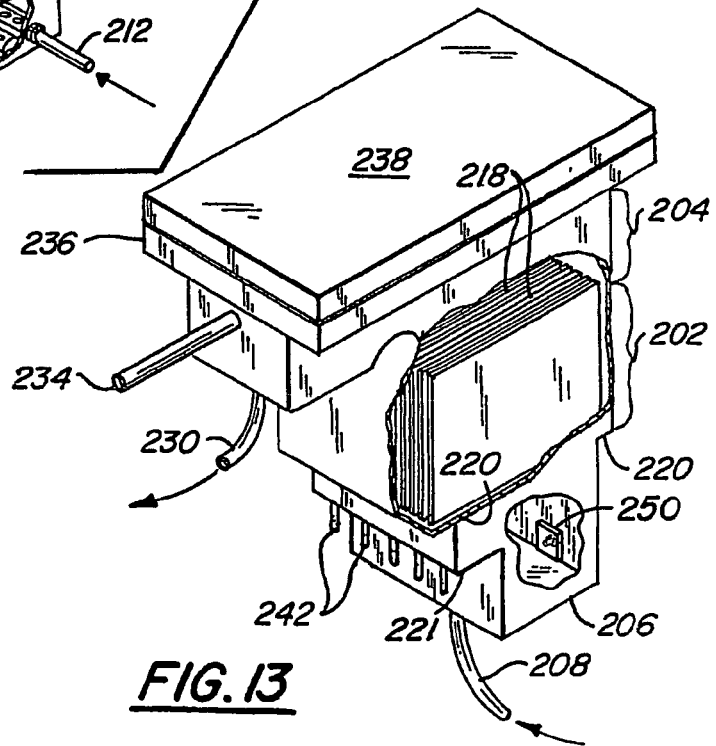
FIG. 13 is another fragmentary perspective view similar to FIG. 12, but illustrating the device in a reversed position, and further illustrating a plurality of reaction plates positioned with the reaction chamber and the top cover placed over the device.

FIGS. 12-17 illustrate a fifth and sixth preferred embodiment of the invention. Beginning first with the description of FIG. 12, the electrocoagulation device 200 can be generally described as an integral housing which includes not only a reaction chamber 202 and development chamber 204, but also a secondary separation chamber 228. More specifically, the device 200 has a main chamber including two components, namely, the lower portion defined by reaction chamber 202 in which the electrolytic reaction takes place, and the development chamber 204 which extends above the upper edges of the reaction plates 218, as shown in FIG. 13. A base portion 206 extends below the reaction chamber 202. An inlet tube 208 connects to the base 206 and provides the entering flow of liquid through the device. Optionally, a distributor tube 210 can be mounted within the base 206 in order to evenly distribute the flow of liquid. As shown in FIG. 12, the distributor 210 has a plurality of openings formed therein and extends perpendicular to the inlet tube 208. Another inlet tube 212 can also be provided to introduce air within the chamber in order to increase turbulence in the flow of liquid. As discussed above, turbulence increases the efficiency of the electrolytic process in some applications.

Additionally, introduction of turbulence into the liquid stream helps to break loose bubbles which form on the surfaces of the reaction plates. Excessive bubbles on the reaction plates hinder the electrolytic process because the bubbles reduce the volume of liquid flow through the reaction chamber. Turbulence introduced by air in the liquid stream helps to break up these bubbles.

The inlet tube 212 communicates with a distributor 214 having a plurality of openings which evenly distributes the introduction of air into the liquid stream. The distributor 214 can simply be an extension of inlet tube 212 which passes through an opening in the base 206. Similarly, in lieu of the perpendicular arrangement between tube 208 and distributor 210, tube 208 may be mounted in the sidewall of the base 206, and the distributor 210 can simply be an extension of the tube 208.

The reaction plates 218 are held in their position within the main chamber by spacers or guides 216 which are mounted on opposing vertical sidewalls of the reaction chamber 202. The spacers 216 shown in this embodiment extend substantially the height of the reaction plates 218. The lower outside edges of the reaction plates 218 rest upon ledges or flanges 220 which are simply the horizontal extensions formed above base 206. A plurality of openings 224 are formed on a lower flange 221 which is positioned below flange 220. As explained further below, bolts which may be connected to a source of power extend through openings 224. As with the other embodiments, a predetermined number of reaction plate tabs may be provided for the set of reaction plates used within the device. The number and spacing of the reaction plate tabs is dictated by the desired amperage and voltage within the electric field of the reaction chamber. FIGS. 12 and 13 illustrate five openings 224 which allow five plate tabs 222 connected to corresponding bolts or tab extensions 242 to extend from the device. However, the number of openings 224 and corresponding plate tabs 222 can be modified, depending on the desired characteristics of the electrical field within the reaction chamber 202.

There are a number of advantages of allowing the reaction plate tabs to extend downwardly. One advantage is that a development chamber may be provided directly above the reaction chamber wherein the development chamber simply constitutes an extension of the main chamber of the device, the development chamber being defined as a portion of the main chamber which extends above the upper edges of the reaction plates 218. Another advantage associated with the configuration of the device in FIG. 12 is that caustic conditions known in the art as etching can be minimized which extends the life of the reaction plate tabs. Any time the reaction plate tabs are subject to an air/liquid line, etching takes place which results in degradation of the reaction plate tabs, often causing them to prematurely break or degrade. Thus, reaction plate tabs which extend beyond the liquid line and have no protection at the air/liquid line can be subject to etching. One solution to the problem of etchings to simply coat the reaction plate tabs with a non-conductive material. However, this adds to the overall expense of the device by having to modify the reaction plates themselves. By having the reaction plate tabs contained within the housing and isolated from the amperage in the reaction chamber, the air/liquid line exposure is eliminated, thereby preventing etching.

The device 200 includes the integral secondary separation chamber 228 which lies adjacent the development chamber 204. The liquid flows over wier 226 and into the secondary separation chamber 228, and finally the liquid exits the device through outlet 230. A riser tube 232 of a selected height extends from the bottom wall of the secondary separation chamber 228. As the liquid flows over the wier 226 into the chamber 228, secondary separation of contaminants may occur wherein the contaminants collect on the bottom surface of the chamber 228. The riser tube 232 therefore prevents the contaminants from simply flowing through outlet tube 230 because many of the contaminants will settle to the bottom of the chamber 228. Line 237 represents a typical liquid line during operation. Preferably, liquid is allowed to flow over the wier 226 at a fairly uniform and constant rate. An upper flange 236 is provided for receiving the top cover 238. Another advantage of providing reaction plate tabs which extend downwardly into the bottom portion of the device is that the construction of the top cover 238 is simplified. That is, there is no requirement for openings or other features on the top cover 238. Furthermore, since there are no upward extending reaction plate tabs, a user is better able to view the device and observe the flow of liquid through the device.

Figure 14:
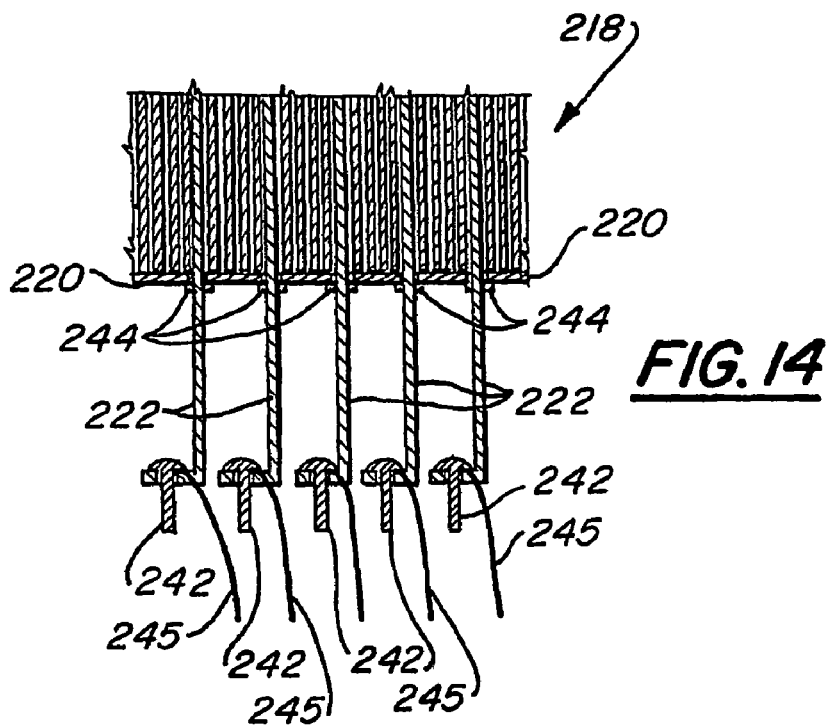
FIG. 14 is a greatly enlarged partial vertical section illustrating a plurality of reaction plates and selected reaction plates with reaction plate tabs which extend downwardly for allowing connection to a power source.
Figure 15:
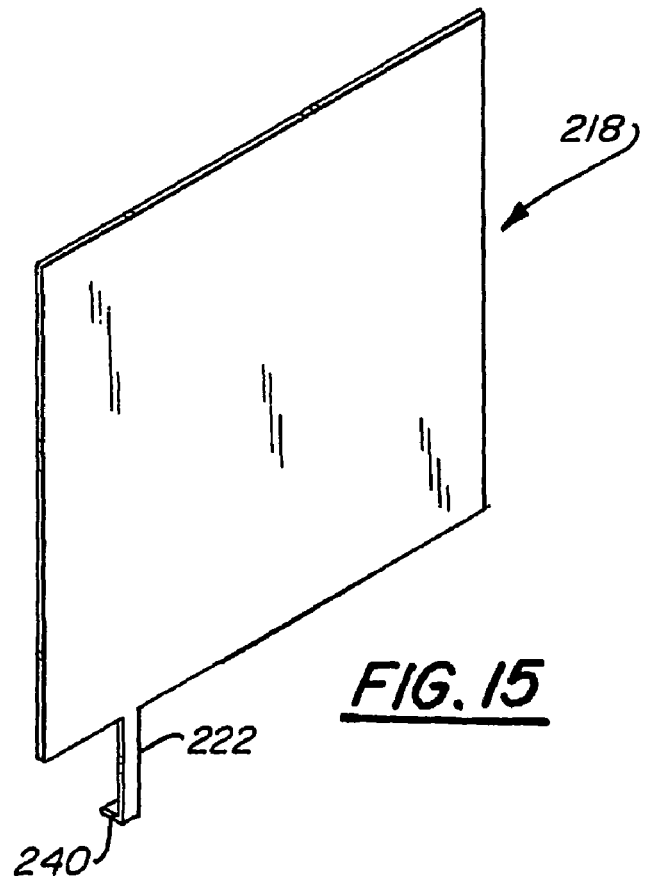
FIG. 15 is an enlarged perspective view of a reaction plate which includes a reaction plate tab.

Another feature which may be incorporated within the embodiment of FIG. 12 is a vacuum tube 234 which may be placed above the liquid line 237, the vacuum tube 234 extending through a selected sidewall of the secondary separation chamber 228. As with the previous embodiments, foam is created by the electrolytic process and the vacuum tube 234 can be used to facilitate extraction of the foam. Yet another feature that can be incorporated within the embodiment of FIGS. 12 and 13, as well as any of the other embodiments, is the use of a sonic cleaning device 250 (shown in FIG. 13). Power cord 252 delivers power to the cleaning device 250. The device 250 as shown can be placed under the plates and within the base 206. The device 250 can be powered by the same power source that delivers electricity to the plate tabs. This device assists in the cleaning of the reaction plates to ensure that the plates did not build up scale or mineral coatings which degrade the ability of the plates to be involved with electrocoagulation. Scale referred to herein is a coating or precipitate that becomes deposited on the plates because of their contact with minerals or chemicals in the liquid stream. Calcium carbonate is just one form of scaling that can form on the blades. Electronic scale control units are available which provide small, compact solutions for scale control. These units utilize an oscillating electronic field through a modulation frequency waveform to produce inaudible sonic pulses that change the electrical and physical properties of scale crystals and other mineral crystals causing the crystal structures to be repelled from the plates. One commercially available electronic descaler that can be used is the DCS-100 electronic scaler sold by GI Industries of Monroe, Conn. Over time, it still may be necessary to acid wash the reaction plates 218. The construction of the reaction chamber which utilizes guides 216 to hold the reaction plates enables easy removal of the plates by simply lifting them out of the reaction chamber. If it is necessary to acid wash the reaction plates 218 having the tabs 222, bolts 242 must first be removed, and then the plates can be removed. It is also contemplated that the acid wash could take place within the reaction chamber with the plates remaining in place. This in-chamber cleaning requires a temporary shut down of the device, and the reaction chamber is filled with the desired acid bath. FIG. 14 illustrates a plurality of reaction plates 218, along with selected reaction plates 218 also having integral plate tabs 222. FIG. 15 illustrates a reaction plate 218 including a reaction plate tab 222 which has its distal or free end bent at a 90° angle forming a small flange 240. A hole may be drilled through the flange 240 for receiving the corresponding bolt or tab extension 242 which attaches the corresponding electrical conductor 245 to the plate tab 222. In order to seal the plate tabs 222 with respect to the openings 224 formed in the device, individual gaskets 244 may be placed below the openings 224 which create a water tight seal thereby preventing leakage of fluid. In lieu of forming a bend or flange 240 in the tabs 222, the bolt could be directly welded to the tab on either side thereof. Those skilled in the art can envision other common ways in which the bolts 242 attach to their respective plate tabs 222.

Figure 16:
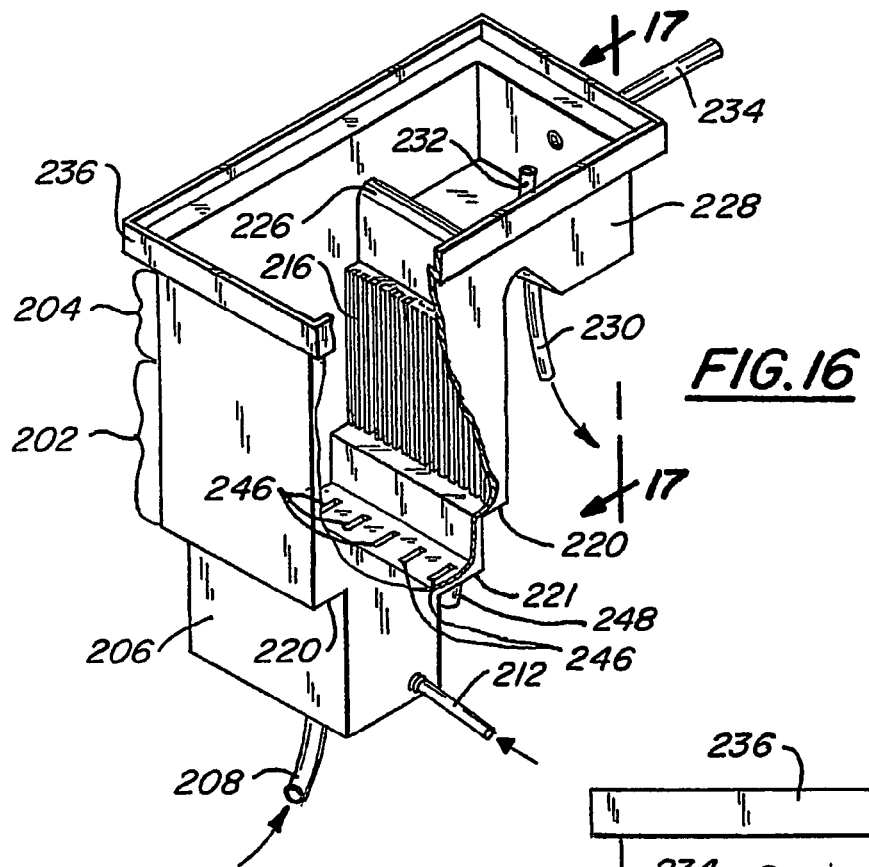
FIG. 16 is another fragmentary perspective view of a modification to the embodiment shown in FIG. 12.
Figure 17:
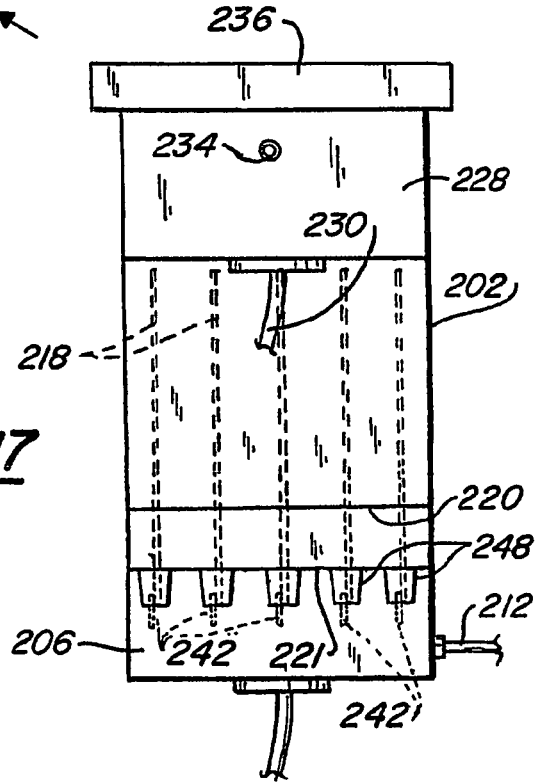
FIG. 17 is a side view taken along line 17-17 of FIG. 16 illustrating the modification.

FIGS. 16 and 17 illustrate one further modification to the embodiments shown in FIGS. 12 and 13, namely, the addition of plate tab housing extensions 248. As shown in FIG. 17, these extensions 248 are simply cup shaped extensions which extend below ledge 221, and which therefore isolate the reaction plate tabs 222 from the amperage in the reaction chamber. Extensions 248 also result in larger openings 246 being formed on the ledge 221.

It is desirable to limit the exposure of the reaction plate tabs to amperage which will otherwise degrade the reaction plate tabs. As with the embodiment shown in FIGS. 12 and 13, since the tabs 222 extend below the reaction chamber, they will be isolated from the amperage within the reaction chamber.

In accordance with the method of this invention, treatment of a liquid stream may be achieved by exposing a liquid flow to an electrical field. The flow of the liquid is an upward direction which allows for gases which are produced in the electrolytic reactions to rise to the surface of the liquid line and escape to the atmosphere. The bulk of the coagulated particles are carried to secondary separation and any remaining particles fall by the force of gravity to the lower portion or base of the chamber for subsequent removal. The amperage and voltage of the electrical field within the electrocoagulation chamber may be varied by connecting the electrical leads to selected plates. Prior to entering the chamber, the liquid stream may be filtered, or appropriate chemicals may be added to enhance reactions within the chamber. As necessary, a pump may be used to force the liquid upwardly through the reaction chamber. Alternatively, the electrolytic reaction may take place in a sealed enclosure such as a pressure vessel which may eliminate the need for a pump if the liquid stream is already under pressure. The use of a pressure vessel also allows the electrolytic reaction to take place in a vacuum environment wherein a source of vacuum is applied to the chamber. After the liquid stream is exposed to the electrical field and the electrolytic reactions take place, the liquid stream may be further treated in a development chamber and may undergo secondary separation. The turbulence of the liquid stream may be increased prior to entering the chamber in order to enhance the electrolytic reactions and to break loose bubbles which form on the reaction plates. Also as necessary, a recycle line can be provided to recycle the treated liquid stream in order to provide further treatment.

Figure 18:
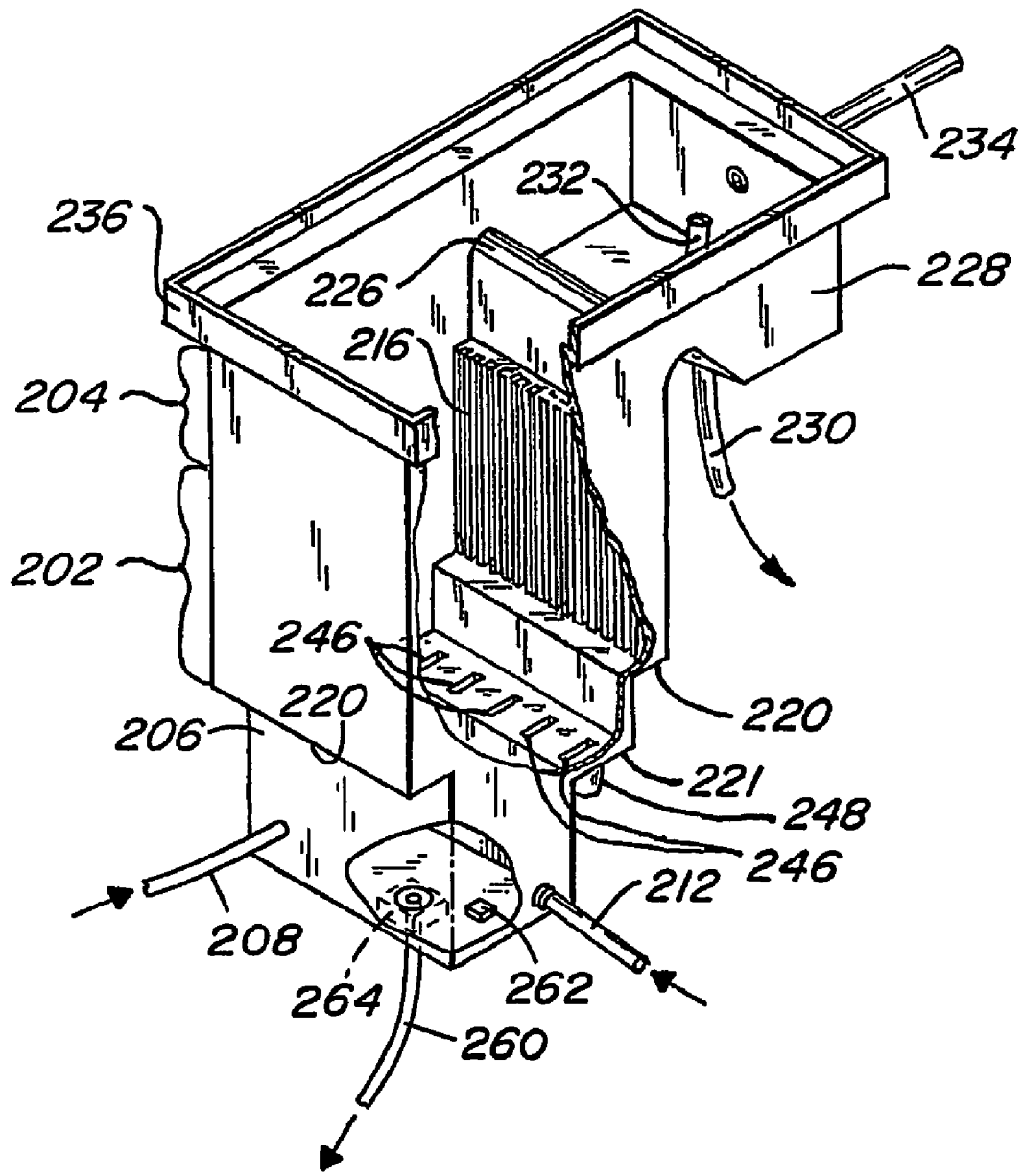
FIG. 18 is a fragmentary perspective view of another preferred embodiment utilizing a drain for removal of water from an oil stream or for removal of salt laden water in desalinating seawater.

FIG. 18 illustrates yet another preferred embodiment of the present invention. Like reference numbers in this embodiment correspond to the same items referenced above with respect to the previous embodiments. Slop oil is a water-oil mixture, and is a product produced from oil well operations. Slop oil is not a commercially usable oil product until the water is removed. One common process to separate the oil and water oil is through the use of large separator tanks; however, this is a time consuming and expensive separation process. Emulsified oils like slop oil can be separated through electrocoagulation. FIG. 18 more specifically illustrates an electrocoagulation device especially adapted for treating slop oil. The inlet tube 208 is preferably located on one of the vertical sidewalls of the base 206, and a drain tube 260 is positioned as shown on the most lower surface of the base. The emulsified oil stream enters the chamber through the inlet tube 208 and the oil stream passes between the reaction plates. As the oil stream is subjected to electrocoagulation, the emulsion is broken and the water separates from the oil. The water attaches to the blades and as the water builds up on the blades, the water beads up and then runs down the blades into the base 206. Typically, the emulsified oil is bound with water having a high salt content. As the salt water builds up in the base of the chamber, if the water volume increases to a point where the salt water touches the reaction plates, the salt water may short out those plates because of the high conductivity of the salt water. To prevent shorting out of the blades by the salt water, the electrocoagulation device may also incorporate a density switch or float switch 262 which is placed in the base of the chamber. The switch 262 detects high conductivity, and once the conductivity reached a threshold level, the switch activates the opening of a valve 264 which allows the drainage of the salt water from within the base 206. Alternatively, the switch could simply measure water level in the base and be set to activate the valve when the water level reached the set point.

The oil which no longer is bound to the salt water is able to float to the top of the chamber and exits through the outlet tube 230. Thus, with treatment of emulsified oil, there is a distinct counter flow of water and oil in the electrocoagulation chamber. The emulsified oil enters the chamber, the emulsion is broken causing the water to flow downward through the chamber and through the drain outlet, while the oil floats and is removed through the outlet tube 230. Depending upon the amount of water within the emulsion, as well as the size of the chamber and the effectiveness of the electrocoagulation in breaking the emulsion, a steady flow of emulsified oil may be treated through the electrocoagulation device without having to stop or intermittently operate the device.

The size of the base 206 which extends below the blades can also be sized to accommodate the anticipated amount of salt water that will separate from the oil stream. In those circumstances when there is a high amount of salt water within the oil stream, the size of the base 206 can be increased to accommodate the increased amount of salt water that will collect there over time. However, the automatic opening of the valve 264 by the float switch 262 enables timely draining of the water to prevent shorting out of the reaction plates. In testing, it has been found that the electrocoagulation device of the present invention is successful in removing water from the oil stream such that there is less than 1% water which remains in the oil stream.

It should also be understood that while this embodiment is shown with the secondary separation chamber 228, the secondary separation chamber is not necessary and separation of oil and water can be effectively conducted within the electrocoagulation chamber 202 and development chamber 204. Thus, the outlet 234 could directly communicate with the development chamber 204.

In summary, in the treatment of an emulsified oil stream, a counter-current flow occurs between the separated oil and water. The heavier water drops out of the oil stream, and collects at the bottom of the chamber. The lighter oil floats to the top of the chamber and is removed from the outlet. Automatic control is provided to allow drainage of the water buildup by the use of a switch which controls a drainage valve.

In addition to the treatment of emulsified oil, the embodiment of FIG. 18 is also especially adapted for desalinating seawater. Like emulsified oil, seawater has a high salt content. The seawater enters the chamber through the inlet tube 208 and the seawater passes between the reaction plates. As the seawater is subjected to electrocoagulation, the salt-laden water attaches to the blades and as the salt-laden water builds upon the blades, the salt-laden water beads up and then runs down the blades into the base 206. As the salt-laden water builds up in the base of the chamber, it is undesirable for the salt-laden water to short out the reaction plates. The float switch 264 discussed above functions in the same manner with respect to salt-laden water wherein the switch detects high conductivity and selectively activates the opening of valve 264 allowing drainage of the salt-laden water from within the base 206. Alternatively, the switch 262 could simply measure water level in the base, and can be set to activate the valve when the water level reaches the set point. Fresh water which has been separated from the salt-laden water floats to the top of the chamber and exists through the outlet tube 230. Thus, with seawater, there is also a distinct counter flow of salt-laden water and fresh water in the electrocoagulation chamber. The salt-laden water flows downward through the chamber and through the drain outlet, while the freshwater flows upward and is removed to the outlet tube 230. Depending upon the salt content of the seawater, as well as the size of the chamber and the effectiveness of the electrocoagulation in separating salt-laden water from fresh water, a steady flow of seawater may be treated through the electrocoagulation device without intermittent operation of the device.

By the foregoing, the advantages of the apparatus and method of this invention should be apparent. The electrocoagulation chamber has the ability to transform incoming line or grid voltage to the voltage and amperage necessary to optimize electrocoagulation treatment. Since the chamber is of simplified construction, the liquid stream does not pass through a torturous and winding path which therefore eliminates much of the liquid pressure. Since the liquid stream travels in an upward path through the chamber, gas which is formed in the electrolytic reactions may form as bubbles and rise to the top of the liquid level for easy removal. Additionally, the bubbling action of the gases in the same direction as the liquid flow prevents gas buildup within the chamber which further reduces pressures induced on the blades. The blades of the apparatus are easily removed by the use of spacers which simply align the blades with respect to one another in a vertical and side-by-side fashion. If desired, the chamber can be placed in a sealed enclosure such as a common pressure vessel which eliminates the need for a pump if the liquid stream supplied is already under pressure. The apparatus of this invention may be configured in a portable or travel unit which makes it feasible for use in austere conditions. Alternatively, the apparatus of this invention may be made on a much larger scale which makes it feasible for use in an industrial setting where greater volumes of treated liquid are required. The blades can be removed individually, or can be removed as an entire set which adds to the versatility of the apparatus.

This invention has been described in detail with reference to particular embodiments thereof, but it will be understood that various other modifications can be effected within the spirit and scope of this invention.

What is claimed is:

1. A method of electrocoagulation treatment of a liquid comprising an emulsified oil, said method comprising the steps of:

providing a housing including a lower portion defining a reaction chamber, a base, and an upper portion defining a development chamber;

arranging a plurality of reaction plates within said reaction chamber, the plates being vertically disposed therein and spaced apart from one another creating gaps between adjacent reaction plates, said reaction plates being consumed over time due to electrocoagulation taking place within said reaction chamber;

providing at least a pair of reaction plate tabs attached to respective selected ones of the plurality of reaction plates, the reaction plate tabs each having a first end attached to said respective reaction plate and a second end that extends through the lower portion of the housing, and the reaction plate tabs being connected to a source of power;

applying a line voltage to the at least a pair of reaction plate tabs to create an electric field within the reaction chamber;

passing a stream of the emulsified oil vertically through the reaction chamber in the gaps between reaction plates;

conducting electrocoagulation of the liquid stream to cause the reaction plates to give up ions whereby the reaction plates are consumed over time, resulting in separation of water from oil in the emulsified oil;

collecting water droplets on the surfaces of the reaction plate due to said conducting step;

generating a flow of water from the surfaces of the reaction plates to the base thus collecting an amount of water in the base;

selectively draining the water collected in the base; and passing the separated oil out of the reaction chamber and through an outlet.

2. A method, as claimed in claim 1, further including the step of:

adjusting the voltage and amperage between the reaction plates by changing the electrical connection between selected ones of the at least a pair of reaction plate tabs.

3. A method, as claimed in claim 1, wherein:

said selectively draining step is achieved by incorporation of a drain on said base, and a switch which detects one of the level of water collecting in said base or the degree of electrical conductivity between plates in contact with the water.

4. A method, as claimed in claim 1, wherein:
said passing step is continuous and a counter flow of the water is drained through the base while the separated oil passes out of the reaction chamber through the outlet.

5. A method, as claimed in claim 1, further including:
detecting a level of water collecting in said base for determining when to drain the water from the base.

6. A method, as claimed in claim 4, wherein said adjusting step further includes:
detaching and reattaching the electrical connections to the reaction plate tabs.

7. A method, as claimed in claim 1, wherein said generating step further includes:
generating a flow of salt laden water downward into the base and a flow upward of separated fresh water resulting in a continuous counter-flow.

\* \* \* \* \*